(12) United States Patent
Abad et al.

(10) Patent No.: US 7,677,311 B2
(45) Date of Patent: Mar. 16, 2010

(54) INTERNAL BREAKER FOR OILFIELD TREATMENTS

(75) Inventors: Carlos Abad, Richmond, TX (US); Jesse C. Lee, Paris (FR); Philip F. Sullivan, Bellaire, TX (US); Erik Nelson, Houston, TX (US); Yiyan Chen, Richmond, TX (US); Belgin Baser, Houston, TX (US); Lijun Lin, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 518 days.

(21) Appl. No.: 11/532,553

(22) Filed: Sep. 18, 2006

(65) Prior Publication Data

US 2007/0032386 A1 Feb. 8, 2007

Related U.S. Application Data

(63) Continuation-in-part of application No. 11/159,023, filed on Jun. 22, 2005, now Pat. No. 7,219,731, which is a continuation-in-part of application No. 10/707,022, filed on Nov. 14, 2003, now Pat. No. 7,066,260, which is a continuation-in-part of application No. 10/227,690, filed on Aug. 26, 2002, now Pat. No. 6,938,693, application No. 11/532,553, which is a continuation-in-part of application No. 11/316,021, filed on Dec. 21, 2005, now Pat. No. 7,398,826.

(51) Int. Cl.
*E21B 43/267* (2006.01)
*E21B 43/27* (2006.01)
*C09K 8/68* (2006.01)
*C09K 8/76* (2006.01)

(52) U.S. Cl. .......... 166/280.1; 166/282; 166/283; 166/300; 166/308.2; 507/922; 507/923

(58) Field of Classification Search .......... None
See application file for complete search history.

(56) References Cited

U.S. PATENT DOCUMENTS

| | | | |
|---|---|---|---|
| 3,272,749 A * | 9/1966 | Martin | 507/119 |
| 3,948,782 A * | 4/1976 | Dreher et al. | 507/135 |
| 4,715,967 A | 12/1987 | Bellis et al. | |
| 4,848,467 A | 7/1989 | Cantu et al. | |
| 4,957,165 A | 9/1990 | Cantu et al. | |
| 4,986,355 A | 1/1991 | Casad et al. | |
| 5,501,275 A | 3/1996 | Card et al. | |
| 5,551,516 A | 9/1996 | Norman et al. | |
| 5,782,300 A | 7/1998 | James et al. | |
| 5,929,002 A | 7/1999 | Joyce et al. | |
| 5,948,733 A | 9/1999 | Cawiezel et al. | |
| 5,964,295 A | 10/1999 | Brown et al. | |
| 5,979,555 A | 11/1999 | Gadberry et al. | |
| 5,979,557 A | 11/1999 | Card et al. | |
| 6,035,936 A | 3/2000 | Whalen | |
| 6,138,760 A | 10/2000 | Lopez et al. | |
| 6,140,277 A | 10/2000 | Tibbles et al. | |
| 6,258,859 B1 | 7/2001 | Dahayanake et al. | |
| 6,306,800 B1 | 10/2001 | Samuel et al. | |
| 6,509,301 B1 | 1/2003 | Vollmer | |
| 6,528,473 B1 | 3/2003 | Lannibois-Drean et al. | |
| 6,537,583 B1 | 3/2003 | Dupuis et al. | |
| 6,596,337 B1 | 7/2003 | Vaslin et al. | |
| 6,637,517 B2 | 10/2003 | Samuel et al. | |
| 6,767,869 B2 * | 7/2004 | DiLullo et al. | 507/244 |
| 6,828,280 B2 * | 12/2004 | England et al. | 507/202 |
| 6,881,709 B2 | 4/2005 | Nelson et al. | |
| 6,908,881 B1 | 6/2005 | Sugihara | |
| 6,908,888 B2 | 6/2005 | Lee et al. | |
| 7,036,985 B2 | 5/2006 | Puente et al. | |
| 7,081,439 B2 | 7/2006 | Sullivan et al. | |
| 7,347,266 B2 | 3/2008 | Crews | |
| 2003/0002195 A1 | 1/2003 | Sassolini et al. | |
| 2004/0102330 A1 | 5/2004 | Zhou et al. | |
| 2004/0152601 A1 | 8/2004 | Still et al. | |
| 2005/0045328 A1 | 3/2005 | Frost et al. | |
| 2005/0161220 A1 | 7/2005 | Todd | |

(Continued)

FOREIGN PATENT DOCUMENTS

GB 2366307 A 3/2002

(Continued)

OTHER PUBLICATIONS

SPE 18211—Laboratory and Field Evaluation of a Combined Fluid-Loss-Control Additive and Gel Breaker for Fracturing Fluids—by Lisa A. Cantu and Phil A. Boyd—SPE Production Engineering, Aug. 1990, pp. 253-260.

*Primary Examiner*—George Suchfield
(74) *Attorney, Agent, or Firm*—David Cate; Robin Nava; Jeff Griffin

(57) ABSTRACT

A composition and method for improving the fluid efficiency of many oilfield treatments is given. The composition is a solid additive, in a viscosified fluid, in a size range small enough that it enters formation pores; it optionally bridges there to form an internal filter cake, and then decomposes to provide a breaker for the viscosifying system for the fluid. Examples of suitable additives include waxes, polyesters, polycarbonates, polyacetals, polymelamines, polyvinyl chlorides, and polyvinyl acetates. Degradation of the additive may be accelerated or delayed.

25 Claims, 12 Drawing Sheets

U.S. PATENT DOCUMENTS

| | | |
|---|---|---|
| 2005/0252659 A1 | 11/2005 | Sullivan et al. |
| 2005/0277727 A1 | 12/2005 | Lannibois-Drean |
| 2006/0157248 A1 | 7/2006 | Hoefer et al. |
| 2006/0201714 A1* | 9/2006 | Seams et al. ............... 175/65 |
| 2006/0211775 A1 | 9/2006 | Crews |
| 2006/0211776 A1 | 9/2006 | Crews |
| 2007/0298978 A1* | 12/2007 | Crews et al. ............... 507/265 |

FOREIGN PATENT DOCUMENTS

| | | |
|---|---|---|
| WO | 0211874 A1 | 2/2002 |
| WO | 02064945 A1 | 8/2002 |

* cited by examiner

INTERNAL BREAKER FOR OILFIELD TREATMENTS

CROSS-REFERENCE TO RELATED APPLICATIONS

This application is a Continuation-in-part of, and claims the benefit of, U.S. patent application Ser. No. 11/159,023, filed Jun. 22, 2005, now U.S. Pat. No. 7,219,731, which was a Continuation-in-part of, and claimed the benefit of, U.S. patent application Ser. No. 10/707,022, filed Nov. 14, 2003, now U.S. Pat. No. 7,066,260, which was a Continuation-in-part of, and claimed the benefit of, U.S. patent application Ser. No. 10/227,690, filed on Aug. 26, 2002, now U.S. Pat. No. 6,938,693. This application is also a Continuation-in-part of, and claims the benefit of, U.S. patent application Ser. No. 11/316,021, filed Dec. 21, 2005, now U.S. Pat. No. 7,398,826. This application is related to copending application "Internal Breaker for Oilfield Fluids," inventors Philip Sullivan, Yiyan Chen, Belgin Baser, Carlos Abad, Mehmet Parlar, and Gregory Kubala, filed Sep. 18, 2006. This application is also related to copending application "Oxidative Internal Breaker for Viscoelastic Surfactant Fluids," inventors Lijun Lin, Carlos Abad, Belgin Baser, Philip Sullivan, Yiyan Chen and Jesse Lee, filed Sep. 18, 2006. This application is also related to copending application "Method for Limiting Leakoff and Damage in Hydraulic Fractures," inventors Richard Hutchins, Marie Dessinges, and Carlos Abad, filed Sep. 18, 2006. These applications are all assigned to the assignee of the present application and are hereby incorporated in their entirety.

BACKGROUND OF THE INVENTION

The Invention relates to recovery of oil and gas from wells, and more particularly to decreasing fluid loss and to breaking fluids inside formation pores when using viscoelastic surfactant fluid systems (VES's) as carrier fluids and treatment fluids.

There are many oilfield applications in which filter cakes are needed in the wellbore, in the near-wellbore region or in one or more strata of the formation. Such applications are those in which, without a filter cake, fluid would leak off into porous rock at an undesirable rate during a well treatment. Such treatments include drilling, drill-in, completion, stimulation (for example, hydraulic fracturing or matrix dissolution), sand control (for example gravel packing, frac-packing, and sand consolidation), diversion, scale control, water control, and others. Typically, after these treatments have been completed the continued presence of the filter cake is undesirable or unacceptable. In such oilfield operations as hydraulic fracturing and gravel packing, viscoelastic surfactant (VES) fluid systems are popular as carrier fluids because of their ability to create a very clean proppant or gravel pack. However, they sometimes experience undesirably high fluid loss, especially when formations with permeabilities greater than about 5 mD are treated. Consequently, fluid loss additives (FLA's) are often used with such carrier fluids to reduce leak off.

There are also many applications in which breakers are needed to decrease the viscosity of treatment fluids, such as fracturing, gravel packing, and acidizing fluids. Most commonly, these breakers act in fluids that are in wellbores or fractures; some breakers can work in fluids in formation pores. Breakers decrease viscosity by degrading polymers or crosslinks when the viscosifiers are polymers or crosslinked polymers. Breakers decrease viscosity by degrading surfactants or changing or destroying micellar structure when viscosifiers are viscoelastic surfactant fluid systems.

Solid, insoluble materials, such as mica, (that may be called fluid loss additives (FLA's), lost circulation additives, and filter cake components) are typically added to fluids used in certain treatments to form filter cakes when they are needed, although sometimes soluble (or at least highly dispersed) components of the treatment fluids themselves (such as polymers or crosslinked polymers) may form the filter cakes, provided that the polymers or crosslinked polymers are too large, or rock pores are too small, to permit entry of much of the polymer or crosslinked polymer. This filter cake is typically on a surface, such as a fracture face. Removal of the filter cake is typically accomplished either by mechanical means (scraping, jetting, or the like), by subsequent addition of a fluid containing an agent (such as an acid, a base, or an enzyme) that dissolves at least a portion of the filter cake, or by manipulation of the physical state of the filter cake (by emulsion inversion, for example). These removal methods usually require a tool or addition of another fluid (for example to change the pH or to add a chemical). This can sometimes be done in the wellbore but normally cannot be done in a proppant or gravel pack. Sometimes the operator may rely on the flow of produced fluids (which will be in the opposite direction from the flow of the fluid when the filter cake was laid down) to loosen the filter cake or to dissolve the filter cake (for example if it is a soluble salt). However, these methods require fluid flow and often result in slow or incomplete filter cake removal. Sometimes a breaker may be incorporated in the filter cake but these must normally be delayed (for example by esterification or encapsulation) and they are often expensive and/or difficult to place and/or difficult to trigger.

There would sometimes be advantages to forming a filter cake inside the pores of a formation. For example, such an "internal" filter cake would not be subject to erosion by fluids flowing across a filter cake that was formed on a wellbore face, a screen, a fracture face, or similar location. Also, an internal filter cake could be more effective at reducing "spurt" the initial fluid loss that occurs as a filter cake is being formed. However, formation of internal filter cakes is usually avoided, since in the past they have been difficult, if not impossible, to remove.

There is sometimes a need to break viscous fluids within the pores of formations, for example when viscous fluids enter formations during fracturing, gravel packing, acidizing, lost circulation treatments, scale squeezes, and the like. These fluids that enter the formation may be main treatment fluids (such as fracturing fluids) or they may be secondary fluids (such as diversion fluids or viscoelastic diverting acids). Most breakers are solids, for example granules or encapsulated materials, that do not enter the formation.

The use of a hydrolysable polyester material for use as an FLA for conventional fluid loss control has previously been proposed; further, degradation products of such materials have been shown to cause delayed breaking of fracturing fluids. U.S. Pat. No. 4,715,967 discloses the use of polyglycolic acid (PGA) as a fluid loss additive to temporarily reduce the permeability of a formation. SPE paper 18211 discloses the use of polyglycolic acid (PGA) as a fluid loss additive and gel breaker for crosslinked hydroxypropyl guar fluids. U.S. Pat. No. 6,509,301 describes the use of acid forming compounds such as PGA as delayed breakers of surfactant-based vesicle fluids, such as those formed from the zwitterionic material lecithin. The preferred pH of the fluid in which these materials are used is above 6.5, more preferably between 7.5 and 9.5. The use of such materials as destroyable internal filter cakes is also known. U.S. Patent Application Publication No. 2005-0252659, assigned to the assignee of the present application and hereby incorporated in its entirety, describes a method in which the fluid contains a solid hydrolysable polyacid that upon dissolution and hydrolysis releases an acid that is a breaker for the viscosifying system. Suitable solid hydrolysable polyacids include polylactic acid and polyglycolic acid. The fluid in that Patent Application also contains a pH control agent, present in an amount sufficient to neutralize any acid present in the solid hydrolysable polyacid before the injection and to neutralize any acid generated by the solid hydrolysable polyacid during the injection, so that the acid breaker is not available to break the fluid during the injection. In one embodiment the viscosifier is a viscoelastic surfactant fluid system and the solid hydrolysable polyacid is of a size selected to be a fluid loss additive, for example in fracturing or gravel packing. In another embodiment, the solid hydrolysable polyacid is used in particles sufficiently small that they enter the pores of the formation. In either case, the viscosifier is broken after the solid releases more acid than can be neutralized by the pH control agent. U.S. Patent Application Publication No. 2006-0157248, assigned to the assignee of the present application and hereby incorporated in its entirety, describes an oilfield treatment in which particles of a polyol such as polyvinyl alcohol are injected into a well. The particles are initially insoluble and are made soluble by heating or by a decrease in salinity. The particles may form an internal filter cake, and after solubilization, they may be breakers.

Additional compositions and treatment methods in which an internal filter cake is formed, and then the filter cake and the viscosifiers used in the treatment are destroyed, would be of value. It would be desirable to have a number of materials that are available in small particles that could be used in a treatment fluid to form an internal filter cake in a formation and that then would decompose without mechanical or chemical action by the operator so that the filter cake was destroyed, releasing degradation products that break viscoelastic surfactant-based viscosifiers in the fluid. It would also be desirable if such materials could be used in particles so small that they did not form a filter cake but still acted as breakers. It would be desirable to have a number of such materials so that they could be used under different subterranean conditions, for example temperature and formation fluid chemistry.

SUMMARY OF THE INVENTION

A first embodiment of the Invention is a method of treating a subterranean formation penetrated by a wellbore involving a) injecting into the formation through the formation surface a fluid containing a viscosifier and a solid additive having particles sufficiently small to pass into the formation pores. The solid additive includes a material that is degradable in the formation, and the additive is allowed to degrade into a material that is soluble in a fluid in the pores after the injection. The material is degradable, for example, by a mechanism selected from thermal degradation, melting, hydrolysis and any combination of these mechanisms. In another embodiment, the fluid is allowed to flow between the formation and the wellbore or between the wellbore and the formation.

In another embodiment, the particles may form an internal filter cake, that is, a filter cake inside the pores of the matrix. In yet another embodiment, the particles may optionally form an external filter cake, that is, a filter cake on the face of the formation.

Various other embodiments involve one or more of the following aspects: The soluble material is a breaker for the viscosifier in the fluid. The step of injection is optionally carried out above the formation fracture pressure to form one or more fractures. The fluid carries proppant or gravel. The fluid contains a formation dissolving compound. The viscosifier is a viscoelastic surfactant, for example a quaternary amine, betaine, carboxylic acids, or amidoamine oxide. The viscosifier is a polysaccharide.

In another embodiment, the viscosifier is a polysaccharide and the particles include a material selected from polyesters, polycarbonates, polyacetals, polymelamines, polyvinyl chlorides, polyvinyl acetates, polyvinyl esters, polyacrylates, polymethacrylates, polycarboxylates and mixtures of these materials.

In another embodiment, the particles include a material selected from waxes, polycarbonates, polyacetals, polymelamines, polyvinyl chlorides, polyvinyl acetates, polyvinyl esters, polyacrylates, polymethacrylates, polycarboxylates, and mixtures of these materials.

In another embodiment, the fluid also contains a pH control agent present in an amount sufficient to neutralize any acid or base present in the solid material before the injection and any acid or base generated by the solid material during the injection.

In another embodiment, the viscosifier is a viscoelastic surfactant and the particles include a material selected from waxes, polyesters, polycarbonates, polyacetals, polymelamines, polyvinyl chlorides, polyvinyl acetates, polyvinyl esters, polyacrylates, polymethacrylates, polycarboxylates, and mixtures of these materials.

Various other embodiments involve one or more of the following aspects: The fluid also contains a fluid loss additive that includes particles too large to pass into the formation pores. The solid additive particles do not form a substantially water impermeable film on formation or fracture faces. The particles are provided as one or more than one of a suspension, a dispersion, a latex, in the internal phase of an oil-in-water emulsion, inside structures selected from the group consisting of micelles, liposomes, vesicles, eucariote and procariote cells, and bacteria, or inside micelles.

In another embodiment, the particles include a member selected from long chain alcohols, aliphatic or aromatic solvents, fatty acids, fatty acid esters, mono, di or triglycerides of fatty acids, long chain alcohol phosphate esters, diacid esters, and mixtures of these materials.

Yet another embodiment is a fluid composition including a viscosifier, and a solid additive involving particles sufficiently small to enter subterranean formation pores; the additive involves a material that can degrade in the formation into a material that is soluble in a fluid in the pores of the formation and is capable of breaking the viscosifier.

DETAILED DESCRIPTION OF THE INVENTION

Figure 1:
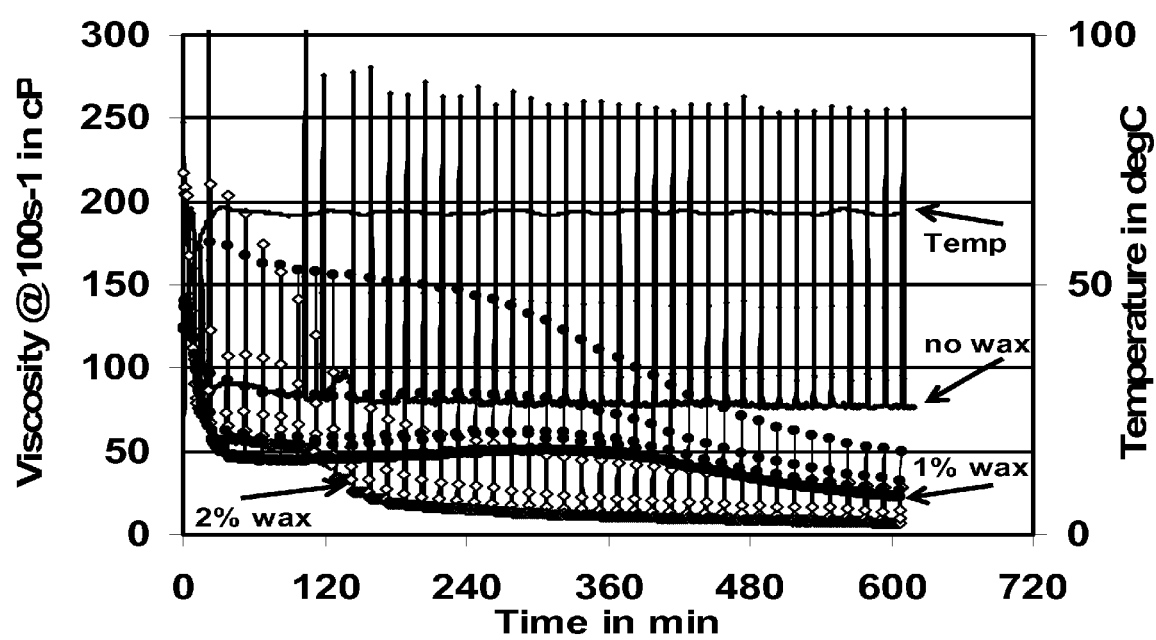
FIG. 1 shows the viscosity vs. time of a fluid that is viscosified with a viscoelastic surfactant system and contains different amounts of a wax internal filter cake/matrix breaker of the Invention.

Added fluid efficiency and ease of cleanup are the most important properties for any fluid loss or lost circulation additive used in oilfield treatment fluids. In treatments of subterranean formations, the total volume of fluids that needs to be pumped for completing the treatment is strongly influenced by the quantity of fluid lost to the surrounding matrix. (When comparatively little fluid leaks off, the fluid is said to be efficient; if comparatively large amounts of fluid leak off, the fluid is said to be inefficient. If 70% of the fluid leaks off, then the fluid efficiency is only 30%.) The conventional approach relies on building an external filter cake (for example on a fracture face or wellbore wall, external to the formation), sometimes with a breaker built into the system. (Also, for viscosified fluids used in oilfield treatments, it is important that there be a mechanism by which the viscosity can be reduced (that is, the fluid can be broken). Typically breakers are added to the fluid. Typically, the action of the breaker is delayed or requires a trigger such as crushing of encapsulated breakers, so that the fluid may perform its function before the break occurs. Proper placement is an important feature for any breaker; it must be with the fluid or filter cake to be broken.) Once a fluid loss or lost circulation additive invades the formation, most conventional breakers (such as encapsulated oxidizing agents) or subsequently added acid will be inefficient for cleaning it up; furthermore, often, the decomposed product (for example polymer fragments or crosslinked polymer fragments) will still be damaging to the formation. Therefore, the formation of an internal filter cake (that is, within the pores of the formation) is normally carefully avoided in order to prevent formation damage.

In conventional fluids having polymers as the viscosifying agents, during the initial phase of the treatment the polymers are typically filtered at the rock face to form a polymer filter cake that subsequently inhibits further losses. If, as is often the case, this is inadequate to limit fluid losses to the rock, additional components, usually solids called Lost Circulation Additives, or Fluid Loss Additives, or FLA's, are added to promote filter cake formation. VES-based fluids are polymer-free, which in itself is a major advantage since polymers, remaining in the matrix once the treatment is over are a main source of formation damage, and consequently the fluid loss process is not governed by polymer filter-cake formation. FLA's may also be added to VES-based fluids to reduce fluid loss, but this may be more difficult because among other reasons there is no polymer to help.

To overcome the tendency of high fluid loss in polymeric and VES-based fluids (in particular in hydraulic fracturing fluids and gravel packing fluids but in many other oilfield treatment fluids as well), various fluid loss control additives have been proposed. Silica, mica, and calcite, alone, in combination, or in combination with starch, are known to reduce fluid loss in polymer-based fracturing fluids, by forming a filter cake which is relatively impermeable to water, on the formation face, as described in U.S. Pat. No. 5,948,733. Use of these fluid loss control additives alone in a VES-based fluid, however, has been observed to give only modest decreases in fluid loss as described in U.S. Pat. No. 5,929,002. The poor performance of these conventional fluid loss additives is typically attributed to the period of high leak-off (spurt) before a filter cake is formed and to the formation of a filter cake permeable to the VES-based fluid. Colloidal suspensions may also be used to form FLA's. These are typically dispersions of discrete very small particles, spherical or elongated in shape, charged so that the repulsion between the same charged particles stabilizes the dispersion, such as those disclosed in U.S. Pat. No. 7,081,439 (Sullivan, et al.), incorporated herein by reference thereto. Disturbance of the charge balance due for instance by removing the water, changing the pH or adding salt or water-miscible organic solvent, causes the colloidal particles to aggregate resulting in the formation of a gel. The particles are less than 1 micron in size, and typically in the range from about 10 to about 100 nanometers. Although one purpose of the Invention is to eliminate the need for previously known FLA's, it is within the scope of the Invention to use previously known FLA's with the compositions and methods of the Invention.

The Invention will be described primarily in terms of hydraulic fracturing, gravel packing, acidizing, and fracture acidizing, although it is to be understood that the Invention may be used in many other ways, for example many other oilfield treatments. In hydraulic fracturing, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is normally viscosified. Increased viscosity results in formation of a wider fracture, thus a larger flowpath. A minimal viscosity is also required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity fluid with good to moderate leak-off properties, and typically no proppant, into the formation. This initial fluid, typically referred to as a "pad", is usually followed by a second fluid (fracturing fluid) of similar viscosity carrying an initially low concentration and then a gradually or step-wise increasing concentration of proppant (in "stages") into the extended fracture or fractures. The pad initiates and propagates the fracture but does not need to carry proppant. All the fluids tend to "leak-off" into the formation from the fracture being created or extended. Commonly, by the end of the job the entire volume of the pad will have leaked off into the formation. This leak-off is determined and controlled by the properties of the fluid (and additives it may contain), the pumping rate and pressure, and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the some point in the fracture, stopping the lengthening of the fracture and resulting in a subsequent increase in the fracture width. On the other hand, excessive leak-off is undesirable because it may waste valuable fluid and result in reduced efficiency of the job. In acid fracturing, the fracture fluid is an acid (or other formation dissolving fluid such as a chelant-containing fluid) and the fluid normally does not contain proppant; the fracture is held open by asperities in the fracture faces caused by differential etching of the formation material. In matrix acidizing, an acid or other formation dissolving fluid is injected below fracture pressure and the fluid enters the formation and dissolves damaging materials and/or a portion of the formation. Proper leak-off control may be critical to the success of these and other oilfield treatments. Many solid particulate additives, such as silica, mica and starch, have been developed to control leak-off. Furthermore, in these and most other treatment types, after the treatment it is necessary to decrease the viscosity of the fluids, i.e. to break them.

We have found that certain solid degradable materials can be used to form internal filter cakes, that is filter cakes inside the formation, with the advantage that such filter cakes are not removed by fluid flow past them, i.e. by erosion. These solid materials do not necessarily form a water impermeable film on formation faces, such as fracture faces. The degradation of the solid particles may occur naturally due to chemical or physical conditions, for example temperature or pH. This degradation may optionally be accelerated or delayed if necessary. This degradation may also optionally be triggered by contact with another fluid, such as another injected fluid, a formation fluid, or a produced fluid. Preferably, at least some of the degradation occurs before flowback or production. Injecting another fluid to promote the degradation is not normally desirable because of potential costs and complexity, but is within the scope of the Invention. Furthermore, the degradation products from some of the solid degradable particulate materials of the Invention are breakers for polymeric viscosifiers, and the degradation products of all of the degradable materials of the Invention are breakers for polymer-free (VES) fluid viscosifiers. The breaking effect occurs whether or not a filter cake is formed, for example in a kill pill, or when the particle size is too small to form bridges, and thus to form a cake. We will call this material an "Internal Filter Cake/Matrix Breaker" or "IFCMB" with the understanding that it has various uses in addition to one or both of internal filter cake former and matrix breaker (and with the understanding that under some circumstances it may enter a formation and not form a filter cake). The IFCMB's are appropriately sized particles of materials that are insoluble in the treatment fluid as pumped but degrade into water-soluble or oil-soluble materials under bottom-hole conditions after being pumped.

We use the terms "solid" and "degrade" and "particle" here for simplicity. It will be seen below that IFCMB's may be materials for which these terms are not strictly precise. For example, IFCMB's may be waxes, cells, or intermediate to high molecular weight polymers that may be "hard solids" or "soft solids". The term "hard solid" is used here to designate crystalline, amorphous or partially crystalline solids that have softening temperatures (melting point, or glass transition temperature, whichever is higher) at least about 30 to 50° C. above room temperature). The term "soft solid" is used here to designate crystalline, amorphous or partially crystalline solids that have softening temperatures close to room temperature (for example, less than about 30° C. above room temperature). IFCMB's may be "particles" in a different sense (for example they may be prepared in cells), and they may become breakers by melting and/or by slow dissolution, or by release of smaller chemicals contained within them, without actual degradation of individual molecules or even of larger structures. The terms "solid" and "degrade" and "particle" are intended to include such additional connotations as will be apparent from the context.

Put simply, these materials, used in the proper way, greatly increase the efficiency of many oilfield operations. These solid materials enter formation pores, optionally bridge there to form a filter cake, and then degrade to break the fluid's viscosifier. They offer high fluid efficiency and complete breaking of the fluid; they minimize the amount of fluid that leaks off, break any fluid that does leak off and in addition any fluid that does not leak off, and they break any filter cake that might form.

These IFCMB's have a significant impact on treatment fluid efficiency by invading a formation and then degrading under bottom-hole conditions into water-soluble or oil-soluble low molecular weight materials, hence eliminating formation damage. The Invention in particular provides for effective treatment of high permeability formations because it reduces the fluid volumes needed. The Invention is particularly suited for use with polymer free fluids that do not form filtercakes. The Invention is especially useful in gravel packing and the like, where near-wellbore damage is often a particularly serious problem. The Invention makes it possible to treat wells previously eliminated as candidates due to the low fluid efficiency that would have been expected. IFCMB's may also function as a self-destructing diverting agent. They may also be used in kill pills, which can be difficult to break because mechanisms often available for breaking (such as crushing of encapsulated materials, or later addition of another component) cannot be used with kill pills. Furthermore, if kill pill leak off is a problem, they prevent it.

In treatments that typically include multiple stages, such as most hydraulic fracturing, acid fracturing, frac-packing, and gravel packing embodiments, the IFCMB may be added in the pad, throughout the treatment or to only some of the stages, such as some of the proppant, gravel, acid, or diversion stages. A self-destructing diverter, fluid loss additive, filter cake former, and breaker is particularly useful in hydraulic fracturing, frac-packing, and gravel packing because mechanical removal methods are impossible and methods involving contacting the additive with an additional fluid are not always practical. Since the additive is self-destructive, it can be placed inside the matrix (internal) without detracting from its effectiveness. Since the additive is self-destructive, it can be used in a kill pill that would otherwise be difficult to break. The compositions and methods of the Invention are also particularly useful in cases where it is desirable to limit leak off but to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, foamers, oxygen scavengers, pH control agents, buffers, and the like. Compatibility of IFCMB's with such additives should be checked in the laboratory. The treatments of the Invention are conducted normally, taking into account improved fluid efficiency and breaking. The treatment fluid and additives are transported to the site, mixed, stored, and pumped in the usual ways for the respective chemicals.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, pressure gradients are combined with fracture length and height evolution algorithms, complete leak-off information, and the effects of multiple fluid injections and their temperature changes.

The optimal size, or size distribution, and concentration of the additive for fluid loss control can be determined by choosing the desired leak-off parameters and measuring leak-off with samples of the intended fluids and of the formation or of a rock similar to the formation. Leak-off is defined by the "spurt", which is the initial rapid leak-off of fluid before a filter cake barrier is formed, and by the subsequent leak-off that occurs even after a filter cake is formed and is governed by the viscosity and the wall-building propensity of the fluid and its components. The term "wall-building" is used because external filter cakes are usually formed on a "wall" such as a fracture face, but it is used here to refer to a conventional external filter cake, an internally formed filter cake, or both. Leak-off is typically measured in units of volume or mass per unit area per unit time; for a fixed geometry in the laboratory, it may be measured simply by mass or volume as a function of time. Measurement of leak-off, prediction, and control of leak-off by formation of a filter cake with a fluid loss additive, are familiar to those of ordinary skill in the arts of well stimulation and sand control.

In a typical propped hydraulic fracturing treatment, the pad fluid is designed to completely leak off into the formation; this complete leak-off ideally coincides precisely with the termination of pumping of the proppant stages (pumping a slurry containing proppant) so that the newly created fracture is propped open. In most, if not all, fracture treatments, leak-off in excess of the minimal amount required for optimal fluid efficiency and fracture dimensions is inevitable and undesirable. Thus the volume of the pad, relative to the volume of the fracture fluid, in a job design is determined by a large number of factors governed by the properties of the fluids and of the formation and the desired final fracture dimensions. The selection of a suitable pad volume is within the ability of those skilled in the art, taking into account the affects of the additive of the Invention on fluid efficiency.

Because in some embodiments the pad and the fracture fluid are polymer-free and the fluid loss additive and breaker are fully degradable, neither the near-wellbore formation nor the proppant bed left in the fracture after the job contains deleterious polymers or solids, as would be the case if the fracture fluid contained any polymer or if the fluid loss additive and breaker were not fully degradable. Therefore fracture conductivity is high and skin is low. However, some of the degradable materials suitable for use as IFCMB's of the Invention release acid when they degrade; acid breaks some polymer and crosslinked polymer viscosified fluids (such as polysaccharides such as guars and substituted guars) and so some IFCMB's may be used with some polymer-based fluids. Those skilled in the art know which polymers are broken by acid and under what conditions.

The methods of the present Invention may still work satisfactorily in formations in which some of the pore throats at the fracture or wellbore faces are too small for some of the additive particles to enter the formation. In that case, external filter cakes in addition to internal filter cakes form, and then degrade. In low permeability formations, only minimal fluid loss control is generally needed, and provision of viscosity to widen the fracture is a relatively more important role of the pad fluid. We define low permeability formations here as having permeabilities of less than about 20 mD, especially less than about 10 mD, and most especially less than about 2 mD. In high permeability formations, fluid loss control is more difficult and more critical and additives more easily penetrate the formation.

While this Invention is not bound by any particular mechanism of operation or theory, it appears that one can define three permeability ranges for a given IFCMB additive particle size distribution and a given VES fluid:

First, a higher permeability range, in which, and above which, the additive particles and VES fluid micelles can enter the formation without forming a filtercake; in this case leak-off is high and/or penetration is deep.

Second, an intermediate permeability range, depending upon the dimensions of the additive and of the initially present VES fluid micelles, and the stability of the micelles of the VES fluid; the additive enters the formation and forms an internal filter cake, and the micelles either enter, or they break and then enter as surfactant molecules or smaller micelles that then reform micelles of the original size.

Third, a lower permeability range below which, still depending upon the dimensions of the additive and of the initially present VES fluid micelles, and the stability of the micelles of the VES fluid, the additive does not enter, the micelles either enter, or they break and then enter as surfactant micelles that then either reform or do not reform micelles. (Additive that does not enter forms an external filtercake; VES may stop entering the formation owing to the filter cake.)

Although there is not universal agreement on the precise relationship of particle size, pore dimension, and bridging, we will use the following guidelines here. Particles having diameters greater than about one-third (some researchers say up to one half) of a pore throat diameter are expected to bridge at or near the formation face. Particles smaller than that but larger than about one-seventh of a pore throat diameter are expected to enter the formation and be trapped and form an internal filter cake. Particles smaller than about one-seventh of a pore throat diameter are expected to pass into the formation and through the pores of the formation without substantially affecting flow. It is to be understood that there are other important factors such as distributions of particle size and of pore size, flow rate, particle concentration, and particle shape.

The concentration range of IFCMB's may be for example from about 0.01% to about 10% by weight of the fluid, for example from about 0.1 to about 3% by weight of the fluid. The amount of IFCMB is determined in the same way as the amounts of breakers and fluid loss additives are determined.

It should be understood that throughout this specification, when we list or describe a concentration or amount range as being useful, or suitable, or the like, we intend that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when we express a certain range, even if we explicitly identify or refer to only a few specific data points within the range, or even to no data points within the range, it is to be understood that the inventors appreciate and understand that any and all data points within the range are to be considered to have been specified, and that the inventors have possession of the entire range and all points within the range. Measurement of breaking and of reduction of fluid loss, and prediction and control of breaking and of reduction of fluid loss, are familiar to those of ordinary skill in the arts of well stimulation and sand control.

One skilled in the art and knowing the properties of a formation and the properties of fluid components could determine when an IFCMB and/or a VES fluid might extensively enter (leak off into) a formation and whether or not an external or internal filter cake would form. This would depend, for example, upon the nature of the VES, the size distribution of the IFCMB additive, and the formation permeability and pore structure. U.S. Pat. No. 5,964,295 (Brown, et. al., issued Oct. 12, 1999; hereby incorporated by reference in its entirety) describes several types of effective VES fluids, although the Invention is not limited to those VES fluids, and explains the inter-relationships of viscosity, and fluid loss and leak-off in relatively low permeability formations (less than about 10 mD for the VES fluid surfactants described in U.S. Pat. No. 5,964,295, but different for different VES fluid surfactants).

Any non-polymeric fluid, for example VES based fluid, can be used in the Invention that is compatible with the formation, the formation fluids, and the other components of the fluid, including IFCMB additives. Particularly effective non-limiting examples of fluids are those described in U.S. Pat. Nos. 5,551,516; 5,964,295; 5,979,555; 5,979,557; 6,140,277; and 6,258,859, all hereby incorporated by reference. Vesicle-based fluids may be used, such as those described in U.S. Pat. No. 6,509,301, hereby incorporated by reference. Any polymer-based or crosslinked polymer-based fluid may be used, provided that the polymer is broken by acid, and that the IFCMB selected releases acid on degradation.

In some cases, a certain amount of leak-off is desired, for example so that a tip screen-out occurs in fracturing, a condition in which the proppant forms a bridge, preferably at the end of the fracture away from the wellbore, stopping the lengthening of the fracture and resulting in a subsequent increase in the fracture width. For example, hydraulic fracturing followed by gravel-packing in a single operation, sometimes called a frac-pac, fracpac, frac pac, frac and pac, or STIMPAC™, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out). The particle size distribution of the IFCMB is adjusted to provide a suitable leak-off rate.

The acid used in the matrix acidizing and acid fracturing methods of this Invention can be any acid used in acid fracturing, including gelled, self-diverting, and delayed acids. Commonly used, but not limiting, acids are hydrochloric, hydrofluoric, fluoboric, acetic, and formic acids and mixtures thereof and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled with suitable VES's.

Although in conventional propped fracturing the most common way to control fluid loss is to build an impermeable or reduced-permeability filtercake on the fracture walls (faces), in acid fracturing, especially with a low viscosity ungelled acid, pad viscosity is important for fluid loss control. In fact, if the pad of a fracturing treatment is an uncrosslinked polymer fluid, some leak-off control will still result even if no or little filtercake is formed, because as the pad leaks off into the formation it will form a layer of viscous fluid in the first several inches of the formation adjacent to the fracture. Also, if the VES has higher low-shear viscosity than high-shear viscosity, which is common, then as the VES leaks off a short distance into the formation, the flow rate decreases, the shear rate therefore decreases, and the fluid becomes more viscous. Such effects can reduce low viscosity ungelled acid leak-off better than a wallbuilding system that dissolves or decomposes in acid. In these cases, an IFCMB would be particularly suitable in the pad because it may be selected to allow penetration of the fluid a specified distance into the formation and then limit further penetration. This allows acid treatment a certain selected depth into the formation before a filter cake forms which performs the very desirable function of diverting subsequent acid.

Sometimes acid fracturing is performed with a series of alternating pad, acid, pad, acid, etc. stages in order to optimize coverage. The first non-acidic pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as crosslinked polymer, or uncrosslinked polymer at high concentrations such as 4.8 to 7.2 g/L (40 to 60 lbm/1000 gallons or ppt). The method of the Invention can be used in at least the first pad and sometimes in all the pad stages. If wormholes are formed, or very fine natural fractures are encountered, that attract acid and minimize the amount of acid that travels along the faces of the growing hydraulic fracture (which is commonly the case in the types of limestone and dolomite formations subjected to acid fracturing or fracturing with alternating pad and acid stages), some or all pad and/or acid stages may beneficially contain IFCMB components to limit acid penetration to a desired depth into the formation and to divert acid to other locations in a fracture or formation. Similarly, matrix acidizing may be performed with alternating stages of acid and another fluid, such as a diverter, some or all of which may be viscosified; the IFCMB's of the Invention may be included in some or all of either the acid or the other fluid to control flow and/or to break a viscosifier.

An important advantage to the use of the IFCMB's of the Invention in fluid loss additives, lost circulation control additives, in external and internal filter cakes, and even in treatments in which no filter cakes are formed (such as in kill pills), is that the degradation products generated in the self-destruction process function as a breaker for viscoelastic surfactant viscosifying agents. Certain acids (such as carboxylic acids), alkyl sulfates, phenols, amines, carbon dioxide, alcohols and other materials are known to damage or destroy either the micelle/vesicle structures formed by some viscoelastic surfactants used to viscosify drilling, completion and stimulation fluids or, in some cases, to destroy the surfactants themselves. Whether a given degradation product (for example an alcohol, an acid, the anion of an acid, etc.) will be a breaker for a given VES depends upon the structures, charges, hydrophilic/lipophilic nature, etc. of the degradation product and the VES. Examples of such structure breakers and surfactant breakers, and others, are described in U.S. Pat. Nos. 6,881,709, and 6,908,881, both assigned to the assignee of the present application and hereby incorporated in their entirety. Sometimes the same material can be a breaker for some surfactants, or at some conditions, and have no effect, or even be a stabilizer, for the same and/or other surfactants and/or at other conditions. Whether a degradation product will be a breaker, and under what conditions, can readily be determined by simple experiments well known to those in the art.

The IFCMB's of the Invention may also be used in conjunction with conventional breakers, that may be used to provide additional breaking capacity where they can be used, such as in fractures. This may be particularly beneficial in cases where an external filter cake must be broken. The IFCMB's of the Invention may also be used in conjunction with internal breakers designed to work in the pores of a formation. Examples are given in copending application "Internal Breaker for Oilfield Fluids," inventors Philip Sullivan, Yiyan Chen, Belgin Baser, Carlos Abad, Mehmet Parlar, and Gregory Kubala, filed Sep. 18, 2006. Breaker aids such as activators, delay agents or stabilizers may also be used specifically in conjunction with the IFCMB's of the Invention.

There are several classes of materials, for example polymers, that have the right chemistry and can be made in suitable sized particles so that they form internal filter cakes and then degrade under bottom-hole conditions to form breakers for VES fluid systems. Materials (such as waxes) that melt as formations warm up after fluids are injected may also be used; in that case, the "degradation" products are simply hydrocarbons. Degradation is, for example, triggered by a temperature increase or by a chemical trigger such as a change in pH. Degradation may also be sufficiently slow, even at formation conditions, that the particles do not degrade until after all the fluid has been pumped. (That would, for example, be the case for certain esters at certain conditions (for example of temperature and pH)). In general, IFCMB's generate effective breakers if the degradation products are, for example, polyelectrolytes, acids, oils or polymers having hydrophobic portions.

Many of the polymers and waxes described here are commonly available in particle size ranges of tens of nanometers to hundreds of microns. Suspensions of such particles are sometimes incorrectly called "emulsions" if they are hydrocarbon particles stabilized in aqueous fluids (by analogy to true "oil in water" emulsions of two liquid phases). Materials available as such suspensions or dispersions are generally available in smaller sizes, down to microns; they may be obtained "dry" or in the usual suspension or dispersion form. If sizes of any of the materials are needed that are not commercially available, they can be made by known methods. Some of the polymers are made in bulk and then fabricated into the desired size and shape, while most of the polymers are polymerized directly in the desired size and morphology, for example via suspension (for particles in the micron size) or emulsion (for particles in the submicron size) polymerization.

Examples of materials suitable for IFCMB's include:

(1) Polyesters In general Structures 1 and 2 are typical of the structures of these materials; they release carboxylic acids and alcohols upon degradation. Degraded products are usually environmentally friendly.

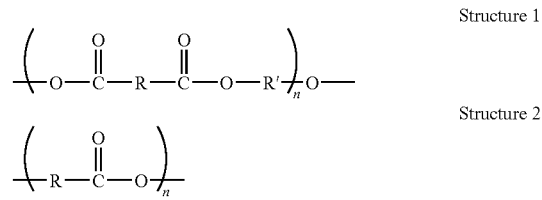

Structure 1

Structure 2

In Structure 1, R is typically a linear short chain aliphatic, saturated or unsaturated, hydrocarbon ranging from zero to about 10 carbon atoms. These are made by esterification, with a suitable alcohol, of a dicarboxylic acid such as oxalic acid, propanedioic acid, maleic acid, fumaric acid, glutaric acid, adipic acid, dodecyldioic acid, or an aromatic diacid such as 1,2-phthalic acid, 1,3-phthalic acid or 1,4-phthalic acid (also commonly known as isophthalic acid, terphthalic acid, etc.) and their derivatives, for example alkyl substituted phthalic acid derivatives, or chlorinated or fluorinated phthalic acid. They are also made by esterification with a suitable alcohol of an anhydride such as maleic anhydride, glutaric anhydride, adipic anhydride, phthalic anhydride; or by esterification with a suitable alcohol of a diacyl halide (e.g. diacyl chloride) such as for example glutaric acid dichloride, adipoyl chloride, phthaloyl chloride. R may also include a branched structure such as in 2-methyl dipropionic acid. R' is typically a linear short chain aliphatic or aromatic chain having from about 2 to about 12 carbon atoms, such as in, for example, ethylene glycol, butylene glycol, hexanediol; a diphenol such as resorcinol; hydroquinone; or a branched structure such as propyleneglycol. Also suitable as precursors for Structure 1 are polyols such as glycerol, sorbitol, manitol; monosaccharides such as glucose, fructose, galactose, manose; disaccharides such as maltose, or sucrose; or polymeric diols such as a polyether such as polyethyleneglycol, polypropyleneglycol polyphenylene oxide, polyphenoxyphenylmethane, polyphenoxyphenylpropane; polymeric polyols such as phenol formaldehyde copolymers (resols, or novolacs); cresol formaldehyde copolymers; epoxy resins; alkyl resins; etc. In Structure 1, n is typically from about 1 to about 100,000, and more typically from about 10 to about 10,000.

In Structure 2, suitable polyesters, are, for example, selected from lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, polymers of 3-hydroxypropionic acid, epsilon caprolactone, 4-hydroxybutyric acid, 5-hydroxypentoic acid, 2-hydroxy valeric acid, 3-hydroxy valeric acid, and mixtures of those materials. Preferred poly(alpha-hydroxy acids) are poly(glycolic acid), poly(DL-lactic acid) and poly(L-lactic acid). Polylactones such as poly(epsilon-caprolactone), poly(delta-caprolactone), poly(delta-valerolactone) and poly(gamma-butyrolactone are suitable. Other suitable polyesters include those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable polyesters are also described in U.S. Patent Application Publication Nos. 2003/002195 and 2004/0152601, both of which are hereby incorporated by reference and are assigned to the assignee of the present application. Particularly suitable polyesters, that are known to be biodegradable, are polylactic acid (polylactide) and polyglycolic acid (polyglycolide), shown as structures 3 and 4. The use of such materials as external filter cake formers and VES breakers, with or without a pH buffer that allows the VES fluid systems to maintain their viscosity if there is some free acid in the polymer or while some of the polymer hydrolyzes, was described in U.S. Patent Application Publication No. 2005-0252659. The use of certain esters (orthoesters such as trimethyl orthoacetate) as delayed breakers for VES's was reported in U.S. Patent Application No. 2005-0045328, but these were not polymers and were not used as solid particles. However, use of solid polyesters without external filter cake formation, e.g. as internal breakers, or as breakers of fluids such as kill pills, or as internal filter cake formers, is not known. Suitable buffers include, but are not limited to, sodium, potassium and ammonium sesquicarbonates, carbonates, and bicarbonates. Soluble oxides, including slowly soluble oxides such as MgO, may also be used. The choice of buffer depends in part upon the VES system used. The appropriate buffer concentration depends upon the IFCMB concentration and primarily upon the desired delay before the onset of the break. Since polyesters degrade into organic acids, they may also be used as IFCMB's with fluids viscosified with suitable linear or crosslinked polymers (such as many polysaccharides, such as guars and derivatized guars).

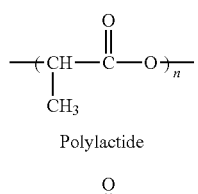

Polylactide

Structure 3

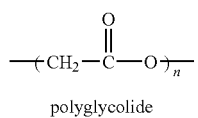

polyglycolide

Structure 4

(2) Polycarbonate Copolymers and Polycarbonates Typical generic structures are shown in Structures 5 and 6. For Structure 5, R and R' are typically a residue of a diol, such as an aliphatic or aromatic chain derived from structures, for example ethylene glycol, butylene glycol, hexanediol; a diphenol, for example resorcinol; a hydroquinone; or more typically a condensation product of phenol and formaldehyde or acetone, for example bisphenol F (bisphenol formaldehyde) or bisphenol A (bisphenol acetone). Branched or substituted variations may also be used, for example alkylated bisphenol A, or propyleneglycol. In Structure 5, n is typically from about 2 to about 100,000, for example from about 10 to about 10,000. In Structure 6, R is typically an aliphatic or aromatic chain derived from structures such as ethylene glycol, butylene glycol, hexanediol, etc.; diphenols such as resorcinol; hydroquinones; or more typically a condensation product of phenol and a ketone or aldehyde, for example formaldehyde, or and acetone, for example bisphenol F (bisphenol formaldehyde) or bisphenol A (bisphenol acetone). Branched or substituted variations may also be used, for example alkylated bisphenol A, or propyleneglycol. In Structure 6, n is typically from about 2 to about 100,000, for example from about 10 to about 10,000. These types of materials release carbon dioxide and alcohols upon degradation. The $CO_2$ pressure thus produced would further energize the system and facilitate the clean up process. Furthermore, the carbon dioxide would make the environment acidic, so polycarbonates may also be used as IFCMB's with fluids viscosified with some linear or crosslinked polymers that are broken by acids, as well as with VES's that are broken by alcohols or acid.

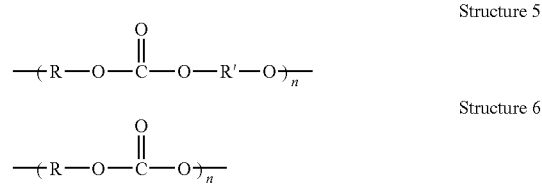

Structure 5

Structure 6

(3) Polvacetals A suitable degradable class of polymer is polyacetals (Structure 7), in which R1 and R2 are either alkyl or H groups. A particular example is polyformaldehyde (Structure 8) or polyoxymethylene such as DELRIN™ (the DuPont Company) which gives formaldehyde upon decomposition, or its copolymers with for instance tetrahydrofuran to yield copolymers such as CELCON™ (Celanese Plastics Co.), or polyvinyl butyral. Polyacetals have low degradation temperatures and thus are good candidates as IFCMB's that undergo thermal degradation readily. Typically, n is from about 2 to about 100,000, and more typically from about 2 to about 10,000 The low molecular weight polyformaldehyde obtained by degradation of polyoxymethylene or the polyformaldehyde encapped with alkyl structures resulting form the degradation of the above listed copolymers may also be breakers for the surfactant.

Structure 7

Structure 8

(4) Melamine polymers and melamine polymer derivatives This type of polymer (for example melamine-formaldehyde resin (structure 9) in which n is typically from about 2 to about 5,000 can easily be derivatized due to the presence of active functional groups. Therefore, degradability can be fine-tuned, and these materials may be more flexible than other polymers. Degradation products having different molecular weights may be used as VES breakers. Melamine monomer or oligomers may be released through the hydrolysis of these polymers. The monomeric or oligomeric species interfere with the VES surfactant structure and disrupt the alignment of the surfactant molecules, thus reducing the fluid viscosity.

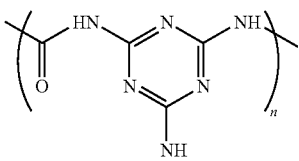

Structure 9

Similarly urea formaldehyde polymer derivatives can also be used, as their thermal stability is lower than that of melamine formaldehyde resins, are their decomposition products can also act as breakers fro the surfactant fluid.

(5) Polyvinyl materials such as Polyvinyl chlorides, Polyvinyl acetates, Polyvinyl esters, Polyacrylates, Polymethacrylates, and Polycarboxylates. Polyvinyl chloride (shown in Structure 10, n is typically from about 10 to about 100,000) is an easily degradable polymer. The chloride atoms on the polymer backbone makes it very susceptible to chemical reaction, releasing HCl. Polyvinyl acetate (Structure 11, n is typically from about 10 to about 100,000) can also be hydrolyzed into polyvinyl alcohol that degrades into small molecules. Degradation of polyvinyl acetates releases acetic acid, so they may also be used as IFCMB's with fluids viscosified with suitable linear or crosslinked polymers (such as many polysaccharides, such as guars and derivatized guars).

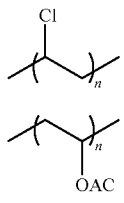

Structure 10

Structure 11

Polyvinyl esters, for example those obtained by copolymerization with other carboxylic acids such as butyric, propionic, oleic, dodecanoic or neodecanoic, (also known as versatic acid) may also degrade to release acids of various hydrocarbon lengths, that may act as breakers for VES fluids. Polyacrylate polymers and copolymers and polymethacrylate polymers and copolymers, for example methyl acrylate, methyl methacrylate, ethyl acrylate, ethylmethacrylate, butyl acrylate, butyl methacrylate, 2-ethylhexyl acrylate, 2-ethylhexyl methacrylate, lauryl acrylate, lauryl methacrylate, oleyl acrylate, oleyl methacrylate, stearyl acrylate, stearyl methacrylate, and others may also degrade, releasing alcohols of various hydrocarbon lengths, that may act as breakers for VES fluids. The hydrolyzed backbone polymer of a polycarboxylate may also act as a breaker for VES fluids. Polycarboxylates obtained by polymerization or copolymerization of acrylic acid, or methacrylic acid, or obtained by hydrolysis of polyacrylamide or of polymethacrylamide polymers or copolymers may also be used as breakers for VES fluids.

(6) Waxes Small wax particles can be used as an IFCMB material if used when the formation in which the filter cake is formed has been cooled to below the melting point of the wax; these are obtained as aqueous suspensions or dispersions of fine particles, usually less than 1 micron. The particles are solid at the temperature of the injected fluid, and that fluid cools the formation sufficiently that the particles enter the formation and remain solid. Early in the treatment, if any wax melts upon contact with a portion of the formation that is above the wax melting point, then incoming injected fluid solidifies this wax, further blocking the pores. After the treatment, when the formation heats back up to its original temperature, the wax melts and flow resumes. The wax molecules are VES breakers. Aqueous wax suspensions or dispersions are commonly used in wood coatings; engineered wood processing; paper and paperboard converting; protective architectural and industrial coatings; paper coatings; rubber and plastics; inks; textiles; ceramics; and others. They are made by such companies as Hercules Incorporated, Wilmington, Del., U.S. A., under the trade name PARACOL®, Michelman, Cincinnati, Ohio, U.S.A., under the trade name MICHEM®, and ChemCor, Chester, N.Y., U.S.A. Particularly suitable waxes include those commonly used in commercial car washes. In addition to paraffin waxes, other waxes, such as polyethylenes and polypropylenes, may also be used. However, it must be kept in mind that if the molecular weight of materials such as polyethylenes and polypropylenes is too high, they will not participate in the micellar phase and thus will not be suitable for use in the Invention. Emulsification in tiny droplets will help alleviate this problem. Furthermore, particle size and the suspension package required to maintain the wax dispersed in the fluid play an important role in the ability of these particles to act as effective breakers, and so such materials must be tested with specific VES fluids (and their additives) under application conditions to ensure suitability.

(7) Polyvinyl alcohols Copending U.S. patent application Ser. No. 11/316,021, filed Dec. 21, 2005, describes the use of certain polyols, such as polyvinyl alcohols, as IFCMB's.

(8) "Encapsulated" IFCMB's IFCMB's may be encapsulated particles, for example (a) by placing them inside structures such as micelles, liposomes, vesicles, eucariote and procariote cells, or bacteria, or (b) by incorporating them in the internal, non-aqueous, phase of emulsions, including micro-emulsions, and including emulsions that could be used to form dry emulsions, or c) by using them as the solid portion of suspensions or dispersions such as latexes (a term often used for stabilized suspensions of solid polymers in water), including suspension of so-called "dry emulsions" which are actually dry fine powders as received and handled until they are suspended. Recall that suspensions or dispersions of some polymer and wax particles are sometimes called "emulsions" if they are hydrocarbonaceous particles stabilized in aqueous fluids (by analogy to true "oil in water" emulsions of two liquid phases). These new materials should be distinguished from conventional encapsulated breakers, in which solid breakers are enclosed in polymeric shells, that are typically the size of proppants, and the breakers are released by dissolving the capsules, by crushing or rupturing the capsules, or by diffusion. "Encapsulated" IFCMB's (quotation marks will not be used further below) may be liquids as well as solids. The manufacture and use of suspensions or dispersions (including dry emulsions) are very well known in the paint, adhesive, paper, textile, and other industries. Latexes are produced by various mechanisms such as emulsion polymerization, mechanical emulsification, ultrasonic emulsification, flow through predefined sized porous membranes, and others. Latexes are often used in the pharmaceutical or agricultural industries to release chemicals such as drugs or insecticides slowly.

Note, in this specification, the term "emulsion" is used for a system that has more than one liquid phase; the terms "dispersion" and suspension are used for a system in which solid particles are suspended in a liquid, and the term "dry emulsion" is used for dry solid particles such as those found suspended in a suspension or dispersion. The term "latex" is conventionally used for a stabilized suspension of small solid polymer particles and will be so used here; "latex" or "latex particles" are sometimes also used here to designate those particles themselves. In a latex, the polymers useful in embodiments of the Invention are dispersed and stabilized in an aqueous medium. Any suitable means of stabilizing and dispersing the polymer in an aqueous medium may by used. The actual technique used is not particularly important as long as the polymer, or polymer particle, remains dispersed in the aqueous medium at least for the time period necessary for delivery to the formation.

It should be noted that the structure, emulsion, or suspension and the IFCMB it contains should be compatible with conventional additives, including, but not limited to clay control additives, iron control additives, temperature control additives, and the like. As already noted, the solid may be a polymer such as a latex resin (also termed latex polymer) stabilized in an aqueous medium. As used herein, the terms "latex resin", "latex", or "latex polymer" refers to a dispersion of a polymer which may be prepared by polymerization techniques such as, for example, by emulsion polymerization, and further, includes polymers prepared by these techniques where the average diameter of the dispersed polymer ranges from the nano scale, such as nanolatexes, to microgels which are on the order of from about $10^{-3}$ microns to about $10^3$ microns in diameter, including any functional diameter therebetween. The latex polymer may be an aqueous suspensions or dispersion of finely divided polymer particles. Any practical blend of latex size may be used in accordance with the Invention, such as a blend of a latex polymer with a nanolatex polymer.

Latex resins are prepared synthetically by polymerizing monomers that have been emulsified with surfactants. For example, in preparing a latex by polymerization, first, typically, sufficient surfactant is dissolved in an aqueous solvent (water, or in some cases mixtures of water and small amounts of co-solvent) to form spherical micelles (therefore at concentrations above the critical micelle concentration). The interior of the micelle provides the site necessary for polymerization. A monomer (for example styrene, hydroxyl ethyl acrylate, methyl methacrylate, vinyl acetate, vinyl versatate, acrylic acid, oleyl acrylate, iso-octyl acrylate, or butyl acrylate) and a water-soluble free radical initiator are added and the whole batch is mixed. Batch, semibatch, and continuous processes are all commonly used to produce polymers by emulsion polymerization. The water rapidly quenches anionic and cationic chain ends. Core-shell latexes are also useful in some embodiments of the Invention. Readily known to those of skill in the art, preparation of core-shell latexes is commonly performed by two-stage emulsion polymerization. In the first stage a polymer is formed as the core by emulsion polymerization. In a second stage, polymerization of a shell crosslinked with the core is prepared by emulsion polymerization. The terms "crosslinked" and "crosslinking" as used herein refer to chemical bonds between existing polymer chains. Typically latex resins (polymers) are stabilized in the aqueous environment by surfactants, by mixtures of surfactants, and by mixtures of surfactants and hydrocolloids, by the functionality of the shell in a core-shell latex, or by a combination of surfactant and the functionality of the shell. Nonlimiting examples of latex types, which may be useful, include latexes of acrylic copolymers, vinyl monomers such as vinyl chloride or fluoride or vinylidene chloride and fluoride, polyvinyl acetate, which by hydrolysis can yield latexes containing polyvinyl alcohol, crosslinked polyvinyl alcohol/vinyl acetate copolymers, polyvinyl pyrrolidone, styrene-butadiene latexes, and the like. Any suitable latex may be used according to the Invention. Additional examples include vinyl acetate homopolymers, and copolymers of vinyl acetate and/or one or more of various acetates such as vinyl versatate (VEOVA), maleic acid or esters, acrylates and methacrylates, or other esters; and copolymers of acrylic acid and/or one or more of various acrylates such as methacrylic acid, methyl acrylate, methyl methacrylate, ethyl acrylate, n-butyl acrylate, and 2-ethyl hexyl acrylate. The most preferred latexes useful for the Invention contain a labile bond, for example an ester bond, in the form of an acrylate, methacrylate or vinyl ester component.

A wide variety of breakers and breaker precursors may be encapsulated to form IFCMB's; not every breaker or breaker precursor can be encapsulated by every encapsulation method, but those familiar with a given encapsulation method will know what can be encapsulated. Representative breakers suitable for these types of encapsulation include long chain alcohols, linear or branched, saturated or unsaturated such as dodecanol, tridecanol, tetradecanol, pentadecanol, hexadecanol, or producers of these alcohols; acids or producers of acids such as stearic acid, oleic acid, dodecanoic acid, linoleic acid, erucidic acid, etc.; hydrocarbon solvents such as tetradecane, hexadecane, octadecane or propyleneglycol monomethyl ether, ethyleneglycol monomethyl ester, etc; crude or mineral oils; waxes; oligomeric polymers, copolymers, and amphiphilic copolymers, such as polystyrene sulfonate copolymers, polyvinyl alcohol copolymers, partially hydrolyzed polyvinyl esters, polynaphthalene sulfonate copolymers, phenolic resins, polyacrylates, polylactic acid, polyglycolic acid, polyhydroxyalkanoates; short chain surfactants; enzymes or proteins; oxidizers, and chelants. Many breakers and breaker precursors are described in U.S. Pat. Nos. 6,881,709 and 6,908,888, each of which is assigned to the assignee of this application and each of which is hereby incorporated in its entirety. Examples of activators that can be encapsulated include acids and bases.

A particularly suitable method of encapsulation of liquids and low-melting solids is formation of dry emulsions, for example according to the methods described in U.S. Pat. Nos. 6,528,473, 6,596,337, and 6,537,583 and U.S. Patent Application Publication No. 2005-0277727. The dry emulsions have an outside shell and an internal solid or liquid phase; they form aqueous suspensions or dispersions when mixed with water.

Solid IFCMB's (such as polymers and waxes) may be manufactured in various solid shapes, including, but not limited to fibers, approximately spherical beads, films, ribbons and platelets. However, since they must be small enough to enter formation pores, and manufactured small particles are generally approximately spherical beads, then these are the preferred form. When slurried in water, these materials could be considered to be a latex, dispersion, or suspension. Sometimes, the particles, for example of a latex, dispersion, or suspension, will consist only of the IFCMB material itself (for example a wax or polymer). Sometimes, as part of the process of making the particles, materials will be used such as surfactants or other polymers; often, these other materials will also be breakers, especially for VES's.

If their degradation is by hydrolysis, the IFCMB's may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the IFCMB's by any means delays the hydrolysis. Note that coating here may refer to conventional encapsulation, for example with a polymer, or simply to changing the surface by chemical reaction or by forming or adding a thin film of another material.

Micelles (of any shape, including vesicles) in a VES base fluid can be the carrier of a hydrophobic component, which will be incorporated into the hydrophobic core of the micelle. The hydrophobic component can be either a VES breaker or a breaker activator; examples include linear alcohols and hydrotrops. The release of these components is controlled by diffusion out of the core into the solvent. Thus the components require a minimum level of water solubility. When vesicles are used for encapsulation of a breaker or activator, the vesicles are most commonly prepared using a mixed surfactant system containing anionic and cationic surfactants. Biological vesicles such as liposomes can be used as suitable delivery mechanisms. Emulsions are well known. Encapsulated breakers of these types are prepared in water or brine by mechanical mixing and stabilization of suitable "capsule" (micelle, vesicle, droplet, etc.) sizes by means of mixtures of non ionic, anionic, cationic, and zwitterionic surfactants, and block copolymers. The viscosity of the organic phase is controlled by the addition of varying amounts of polymer or oligomer. Many of the polymers previously discussed as IFCMB's (for example PLA, PGA, non crosslinked polyesters, such as alkyd resins, non crosslinked melamine resins, non crosslinked epoxy resins, non crosslinked phenolic resins, polyvinyl acetate copolymers, polyacrylate copolymers, for example those acrylates obtained from long chain alcohols, may be used to control the viscosity. The polymer or oligomer itself, or its degradation products may also be used as effective gel breakers. This approach helps control the rate of diffusion of the organic compound out of the capsule and therefore aids the slow release of the organic molecule. Breakers that may be encapsulated in micelles, vesicles, or droplets include but are not limited to: long chain alcohols (for example from about $C_8$ to about $C_{24}$), aliphatic or aromatic solvents, fatty acids (for example from $C_{12}$ to about $C_{24}$), fatty acid esters, mono, di or triglycerides of fatty acids, long chain alcohol phosphate esters, diacid esters (also known as dibasic esters) such as dialkyl maleates, dialkyl fumarates, dialkyl glutarates, and dialkyl adipates, in which the term alkyl indicates aliphatic or aromatic groups coming from alcohols having 1 to about 24 carbon atoms, for example methyl, ethyl, butyl, dodecyl, octyl, hexadecyl, oleyl, or erucyl alcohols, other dibasic esters, and mixtures thereof.

Enzymes and proteins may be encapsulated in, for example, fatty acids, polyvinyl alcohol and synthetic resins. The solubility and/or the porosity of the coating dictate the time dependent release of the enzyme. Suitable materials are described in copending application "Internal Breaker for Oilfield Fluids," inventors Philip Sullivan, Yiyan Chen, Belgin Baser, Carlos Abad, Mehmet Parlar, and Gregory Kubala, filed Sep. 18, 2006.

In use, small amounts of an encapsulated embodiment of an IFCMB, such as a latex containing at least one type of, for example, an organic molecule that can disrupt the ordering of a viscoelastic surfactant wormlike micelle, is added to a VES fluid system before the fluid is injected. The subsequent slow release of the organic molecule controls the timing of the breaking of the VES gel. The release is controlled by either the solubility of the latex shell in the aqueous fluid or by the ability of the breaker to diffuse through the shell into the base fluid, or by contact of the latex particle surface with the micelle to be broken. Other parameters that may affect the rate of release of the breaker are the temperature and the viscosity of the base fluid.

In some applications a slow release is not appropriate, and a delayed release is preferred. In such cases degradable surfactants may be used to stabilize the latex particles; their degradation rate then affects the stability of the latex. Examples of degradable surfactants may be found in U.S. Pat. No. 7,036,985, and U.S. Patent Application No. 2004-0102330, each of which is assigned to the assignee of the present application and each of which is hereby incorporated in its entirety.

Microbial cells of different species such as alcaligenes latus, alcaligenes eutrophus, bacillus megaterium or ralstonia eutropha, may under predetermined growth conditions contain various amounts of naturally occurring polyesters, generally known as polyhydroxyalkanoates, such as copolymers of polyhydroxybutyrate, polyhydroxyvalerate, polydroxyhexanoate, and/or polyhydroxyoctanoate. Bacteria containing these polymers may be used to transport delayed breakers. The conditions downhole (for example pH, temperature, pressure, and salinity) may be used to cause the bacterial cell membrane to destabilize, rupture or burst by mechanisms such as osmosis. These bacteria are then acting to encapsulate the polyesters, which may be breakers of VES fluids when they are released when the cell membrane bursts. Additional delay is possible due to the kinetics of the decomposition of the polyesters. Compounds such as waxes, oligomers, or other polymers that are not assimilated by living cells, or bioproducts that can be assimilated by living cells (such as fat or mono, di or triglicerides), but that are stored in the cytoplasm when there is an excess of nutrients and a deficit of critical compounds for their metabolism (for instance lack of a required oligoelement such as a metal, or a particular aminoacid), and are VES breakers, can be incorporated into the cytoplasm of such cells. This is called endocytosis when a cell engulfs some of its intracellular fluid; it is phagocytosis when the engulfed material is suspended particles and pinocytosis when the engulfed material had been in solution. The contents of cells are protected from their environments by various biological membranes. These membranes are permeable and can be used to allow slow release of the contents of the cell by diffusion; the contents of the cells may also be liberated by bursting of the cell membrane by changes in temperature, pressure, pH, or salinity. Thus the cells containing the appropriate chemicals may be delayed VES breakers. The compounds forming the cell membrane can also be liberated during the bursting process, and eventually become breakers for the fluid. The contents of the microbial cells themselves is composed of multiple organic compounds (polysaccharides, lipids, nucleic acids, and notably proteins of all the types that may also be breakers for VES fluids.

In some cases it may be necessary or suitable to accelerate the degradation of IFCMB's. This may be done in many ways, depending upon the chemistry and form of the IFCMB. Accelerants may be incorporated in the IFCMB particles or may be in the fluid phase containing the IFCMB's or may be in another fluid phase or in another fluid. More than one type of accelerant may be used. One type of IFCMB may be an accelerant for another type of IFCMB. Non-limiting examples of methods of accelerating the degradation of IFCMB's include further including oxidizers, with or without oxidation catalysts; further including latent acids; further including enzymes; and by increasing the temperature.

The IFCMB's may be added to a wellbore fluid by metering them in to the base water fluid as a concentrated liquid. If the material is received as a suspension or dispersion, it can be stored in that form and used in that form directly. If it is received in dry form (for example as a solid dispersible powder of fine polymer beads or as a dry emulsion) the particles can be pre-dispersed in water or brine as required and metered in as a liquid stream, or alternatively they may be added as solids to the base fluid stream. Note that mixtures of different types of IFCMB's may be used, including mixtures of different chemistries (for example a mixture of two different latexes, or a mixture of a wax and a latex) and mixtures of two different physical forms (for example a mixture of an emulsion containing one type of particle in the discontinuous phase and one type of particle in the continuous phase).

The IFCMB degrades (self-destructs) in situ, that is, in the location where it is placed. Although we have discussed here primarily oilfield treatment uses in which the material has been placed inside formation pores, the material may also be placed as part of a suspension in a treatment fluid in the wellbore, in the perforations, in a gravel pack, or in a fracture; or as a component of a filter cake on the walls of a wellbore or of a fracture. It is particularly advantageously used where it is difficult to introduce a breaker (for example in a kill pill) or where it is difficult to trigger a break (for example in a gravel pack). The IFCMB may also be used in other industries such as household and industrial cleaning.

A particular advantage of many these materials is that they and their degradation products are generally not toxic to humans and aquatic animals and are they are typically biodegradable.

The IFCMB's may be used in carbonates and sandstones. In carbonates, acid produced by hydrolysis of some IFCMB's stimulates the formation. Such mixtures that generate extra acid are particularly useful in drilling, "drill-in", and stimulation operations in carbonate reservoirs.

The rate of degradation of a particular IFCMB, having a particular chemical and physical make-up, including a coating if present, at a particular temperature and in contact with a viscosified fluid or fluids of a particular composition (for example pH and the concentration and nature of other components, especially electrolytes), is readily determined by a simple experiment: exposing the IFCMB to the fluid or fluids under treatment conditions and monitoring the viscosity.

Some VES systems, for example some cationic systems, are not very sensitive to pH, and some VES systems, for example some anionic systems, are typically buffered to a pH of above 12 in normal use, and the IFCMB's of this Invention that generate acid upon degradation may not be easily used as breakers of such systems. In those cases, other IFCMB's are used.

The IFCMB's of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). Preferred VES's are cationic, anionic, amphoteric, and zwitterionic. Suitable VES's, for example, are described in the following U.S. Patents, all of which are hereby incorporated in their entirety: U.S. Pat. Nos. 5,964,295; 5,979,557; 6,306,800; 6,637,517; and 6,258,859. The viscoelastic surfactant may be, for example, of the following formulae: R-Z, where R is the hydrophobic tail of the surfactant, which is a fully or partially saturated, linear or branched hydrocarbon chain of at least 14 carbon atoms and Z is the head group of the surfactant which may be for example $-NR_1R_2R_3^+$, $-SO_3^-$, $-COO^-$ or, in the case where the surfactant is zwitterionic, $-N^+(R_1)(R_2)R_3-COO^-$ where $R_1$, $R_2$ and $R_3$ are each independently hydrogen or a fully or partially saturated, linear or branched, aliphatic chain of at least one carbon atom; and where $R_1$ or $R_2$ may comprise a hydroxyl terminal group.

Cleavable viscoelastic surfactants, for example of the following formula, may be used, as disclosed in International Patent Application WO02/064945: R—X—Y—Z, where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is a short saturated or partially saturated hydrocarbon chain of n carbon atoms where n is at least equal to 1, preferably 2 and, when n is equal to or greater than 3, the chain may be a straight or branched saturated or partially saturated chain, and Z is the head group of the surfactant which can $NR_1R_2R_3^+$, $-SO_3^-$, $-COO^-$ or, in the case where the surfactant is zwitterionic, $-N^+(R_1R_2R_3-COO^-)$ where R1, R2 and R3 are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A nonlimiting example of a suitable cationic viscoelastic surfactant useful for the implementation of the Invention is N-erucyl-N,N-bis(2-hydroxyethyl)-N-methyl ammonium chloride. Nonlimiting examples of some suitable anionic viscoelastic surfactants useful for the implementation of the Invention are monocarboxylates RCOO— such as oleate where R is $C_{17}H_{33}$ or di- or oligomeric carboxylates such as those disclosed in International Patent Application WO 02/11874.

The IFCMB's of this Invention have been found to be particularly useful breakers when used with several types of zwitterionic surfactants. In general, suitable zwitterionic surfactants have the formula:

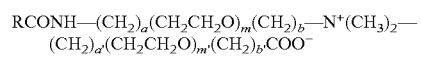

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines and amidoamine oxides.

Two examples of betaines are oleylamidopropyl dimethyl betaine and erucylamidopropyl dimethyl betaine. Oleylamidopropyl dimethyl betaine contains an oleyl acid amide group (including a $C_{17}H_{33}$ alkene tail group); erucylamidopropyl dimethyl betaine contains an erucic acid amide group (having a $C_{21}H_{41}$ tail group). Betaine surfactants, and others that are suitable, are described in U.S. Pat. No. 6,258,859.

Although the Invention has been described throughout using the term "VES", or "viscoelastic surfactant" to describe the non-polymeric viscosified aqueous fluid, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

Also optionally, fracturing fluids may contain materials, such as fibers, designed to assist in proppant transport and/or to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

The IFCMB's of the Invention may also be used in gelled oils such as a gelled refined oil (commonly called a "frac oil" in the industry) or any similar material that provides some viscosity and does not leave damaging solids in the fracture. The following products of Dome Petroleum Limited of Calgary, Alberta, may be used: FRAC OIL 120, FRAC OIL 200, FRAC OIL 300, FRAC OIL 500; as well as SUPER FRAC™ available from Home Oil Company Limited of Calgary; as well as kerosene, diesel fuel, condensate, and crude oil. The IFCMB may not be a breaker for gelled oils.

Some of the IFCMB's of the Invention may also be used in fluids viscosified with polymers such as biopolymers, such as polysaccharides, including crosslinked polymers, provided, of course, that the IFCMB selected contains or releases an agent, such as an acid, a chelating agent, or an oxidizer, that will break either the polymer or the crosslink or both.

The particle size of the IFCMB is chosen based primarily on the desired fluid loss properties. If an external filter cake is desired, at least a portion of the IFCMB must be too large to enter the pores of the matrix. If an external filter cake is not desired, the particles must be small enough to enter the pores. Then the size depends upon whether an internal filter cake is desired (which would be the case, for example if a filter cake was desired but an external filter cake would be subject to erosion). The choice of material is based primarily on the desired rate of degradation in the fluid to be used at the temperature at which it will be used. These choices may also be influenced by the desired time before the delayed break, which could depend upon the size of the job, the nature of the job, and other factors known to those of ordinary skill in the art. Similarly, the concentration of any buffer, delay agent, or accelerating agent is based upon many factors that will be clear to one of ordinary skill in the art, including the concentrations and natures of the VES, the IFCMB and any other additives, the temperature, and the desired time to break. The appropriate buffer, delay agent, or accelerating agent concentration can be determined by simple laboratory experiments, for example mixing all the components, heating to the job temperature, and monitoring the viscosity. The system comprising an IFCMB may be used in any aqueous fluid from fresh water to heavy brines; a requirement is compatibility of the water with the VES system. The system comprising an IFCMB also works with VES systems that contain co-surfactants or other additives commonly included in oilfield treatment fluids. Again, a requirement is compatibility with the VES system. The fluid containing an IFCMB may be batch-mixed or mixed on-the-fly.

When IFCMB's are used in fluids in such treatments as drilling, drill-in, completion, stimulation (for example, hydraulic fracturing or matrix dissolution), sand control (for example gravel packing, frac-packing, and consolidation), diversion, well killing, lost circulation control, and others, the IFCMB's are initially inert to the other components of the fluids, so the other fluids may be prepared and used in the usual way. When Resin Coated Proppants (RCP's) are used, testing should be done to ensure that the RCP's and IFCMB's are compatible and that neither interferes with the performance of the other; conventional natural and synthetic proppants and gravels may normally be used without testing. Normally, such fluids already contain a fluid loss additive and filter cake former, so the IFCMB's replace some or all of the fluid loss additive and filter cake former that would otherwise have been used. In many cases, if the fluid contains a component that would affect or be affected by the IFCMB (such as a buffer, an acid-reactive material, or a viscosifier that forms or is incorporated in filter cakes), either the amount or nature of the IFCMB or the amount or nature of the interfering or interfered-with component may be adjusted to compensate for the interaction. This may readily be determined by simple laboratory experiments.

Any additives normally used in such treatments may be included, again provided that they are compatible with the other components and the desired results of the treatment. Such additives can include, but are not limited to anti-oxidants, crosslinkers, corrosion inhibitors, delay agents, biocides, buffers, fluid loss additives, etc. The wellbores treated can be vertical, deviated or horizontal. They can be completed with casing and perforations or open hole.

In gravel packing, or combined fracturing and gravel packing, it is within the scope of the Invention to apply the compositions and methods of the Invention to treatments that are done with or without a screen. Although treatments are normally done to promote hydrocarbon production, it is within the scope of the Invention to use the compositions and methods of the Invention in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be used. Adjustment of the appropriate concentrations due to any changes in the fluid properties (or other parameters, such as proppant concentration) consequent to foaming would be made.

EXPERIMENTAL

Example 1

Waxes

As with other materials suitable as IFCMB's, when wax particles are significantly smaller that the formation pore sizes, then the wax particles act only as sources of a breaker. In this case, they release a breaker for most viscoelastic surfactant based fluid systems when they melt. When the particles are larger relative to the pore throats of the formation, they form an internal filter cake, and then when they melt they provide the breaker. One skilled in the art will know how to choose the appropriate size range that will or will not form an external or internal filter cake for a given formation, and will know how to test to determine the proper wax particle concentration.

FIG. 1 shows the viscosity as a function of time at 65.6° C. (150° F.) of a fluid viscosified with 4 weight percent of a viscoelastic surfactant concentrate containing about 38 weight % erucylamidopropyl dimethyl betaine surfactant, 1.1 weight % polynaphthalene sulfonate, 22 weight % isopropanol, 5 weight % sodium chloride and the remainder water. The fluid also contained 2 weight % KCl and 1 weight % ethyleneglycol monobutyl ether. The figure shows the viscosity of this fluid with no wax, 1 weight % wax dispersion, and 2 weight % wax dispersion. The wax was "paraffin 150-50" obtained from ChemCor, Chester, N.Y., U.S.A. This material is a highly refined petroleum product containing less than 3% oil, and is a low molecular weight, straight chain hydrocarbon with a melting point of about 66° C. (about 150° F.). It is used in commercial car washes. As received, it is called an "emulsion" by the manufacturer and is about 40-51% wax and has a pH of about 9.7 to 10.7. It can be seen that this fluid at this temperature showed no tendency to break in the absence of the wax. The wax dispersion caused a break; with increasing amounts of wax dispersion, the rate of break and extent of break both increased.

Figure 2:
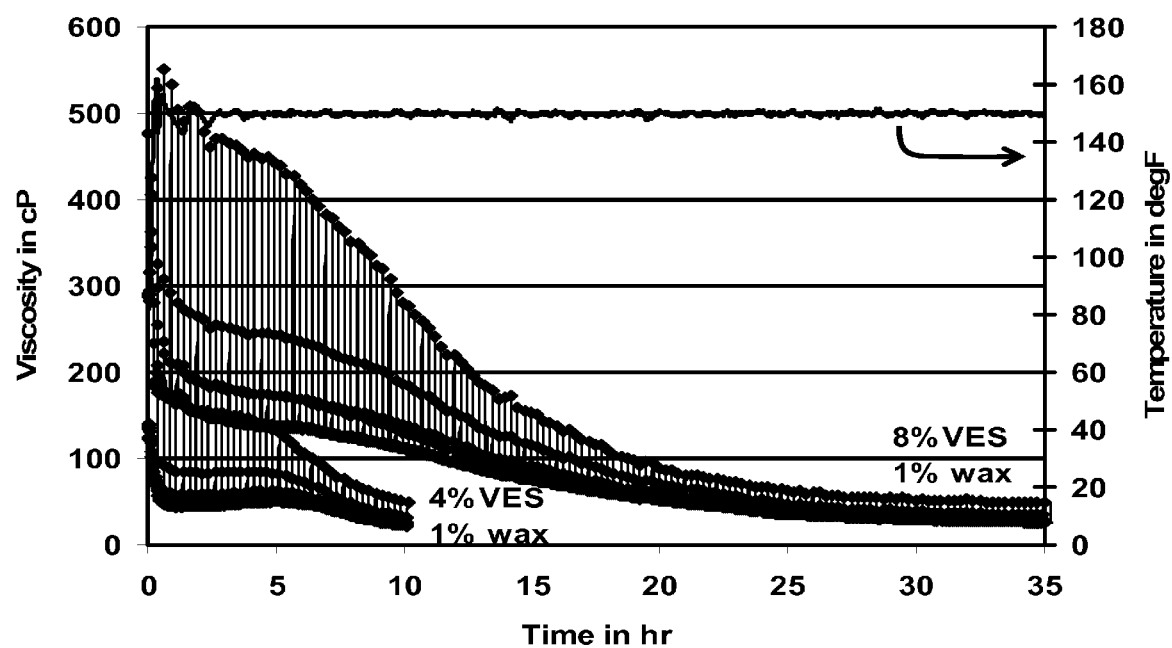
FIG. 2 shows the viscosity vs. time of a fluid viscosified with two different concentrations of a viscoelastic surfactant system containing the same amount of a wax internal filter cake/matrix breaker of the Invention.

FIG. 2 shows the break in viscosity of fluids containing 4 weight % or 8 weight % of the same viscoelastic surfactant concentrate in a fluid containing 2 weight % KCl, 1 weight % ethyleneglycol monobutyl ether, and 1 weight % of the same wax dispersion at 65.6° C. (150° F.). In this case, the fluid containing the higher VES concentration was stable for many hours.

Figure 3:
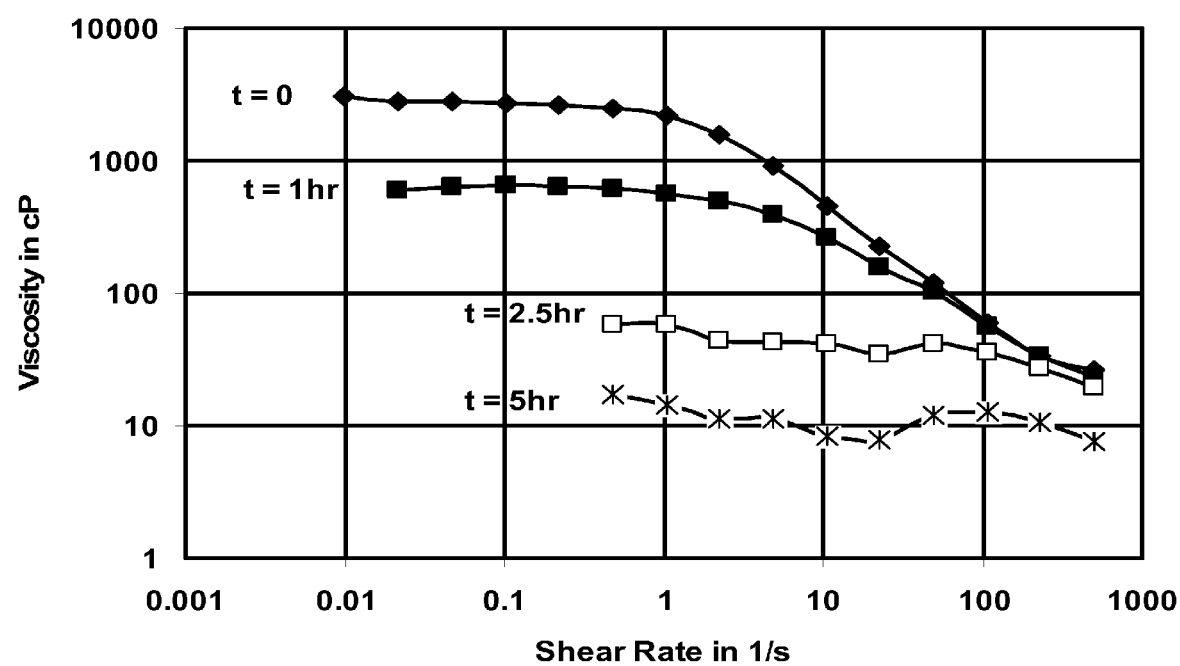
FIG. 3 shows the viscosity vs. shear rate and time of a fluid viscosified with a viscoelastic surfactant system containing a wax internal filter cake/matrix breaker of the Invention.

FIG. 3 shows the fluid containing 4 weight % of the same viscoelastic surfactant concentrate, 2 weight % KCl, 1 weight % ethyleneglycol monobutyl ether, and 1 weight % of the same wax dispersion at various times and various shear rates at 65.6° C. (150° F.). The results were obtained with a Bohlin rheometer. In these experiments, 5 hours was required to reduce the viscosity to about 10 cp over the full shear rate range examined.

Figure 4:
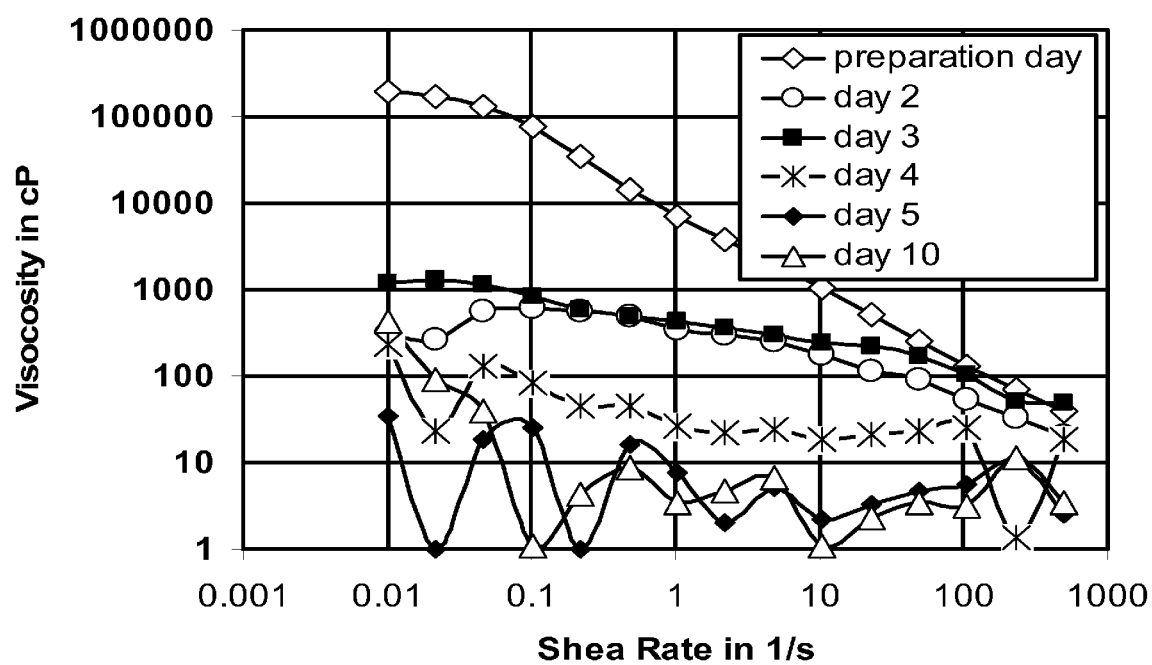
FIG. 4 shows the viscosity vs. shear rate and time of a fluid viscosified with a viscoelastic surfactant system and weighted with NaBr containing a wax internal filter cake/matrix breaker of the Invention.

FIG. 4 shows a fluid containing 6 weight % of the same viscoelastic surfactant concentrate, 1.38 kg/L (11.5 ppg) NaBr, 1 weight % ethyleneglycol monobutyl ether, and 1 weight % of the same wax dispersion at various times and various shear rates (Bohlin rheometer) at 65.6° C. (150° F.). The fluid shows faster initial viscosity losses at low shear rates than at high shear rates, but shows useful viscosity at low shear rates for at least 5 days and for at least 4 days at high shear rates. This system could be described as displaying a controlled break at about 5 days.

Figure 5:
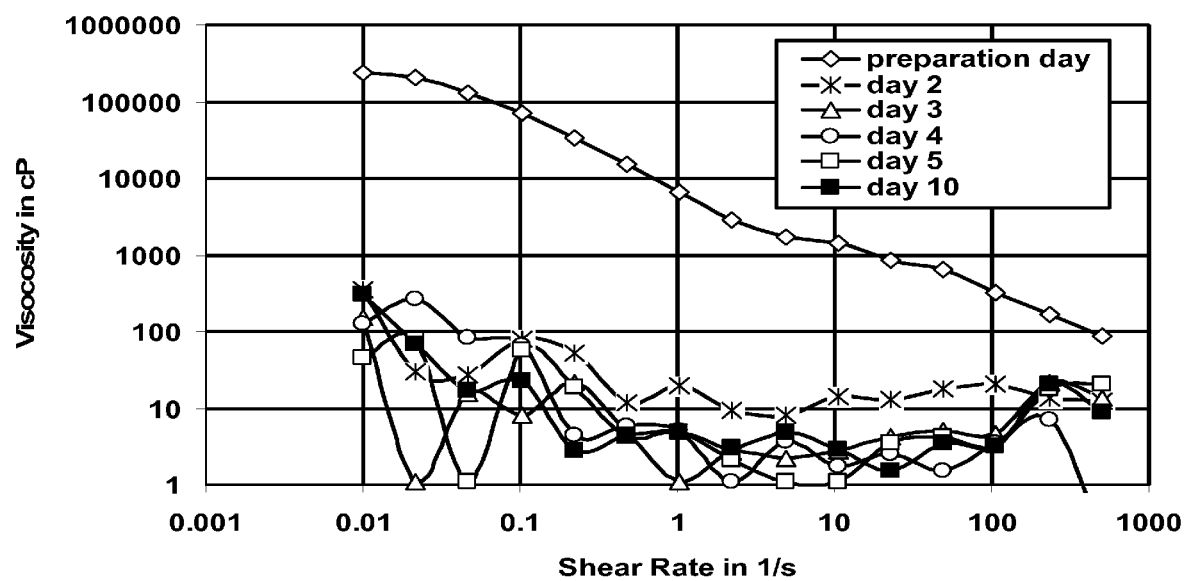
FIG. 5 shows the viscosity vs. shear rate and time of a fluid viscosified with a viscoelastic surfactant system and weighted with $CaBr_2$ containing a wax internal filter cake/matrix breaker of the Invention.
Figure 6:
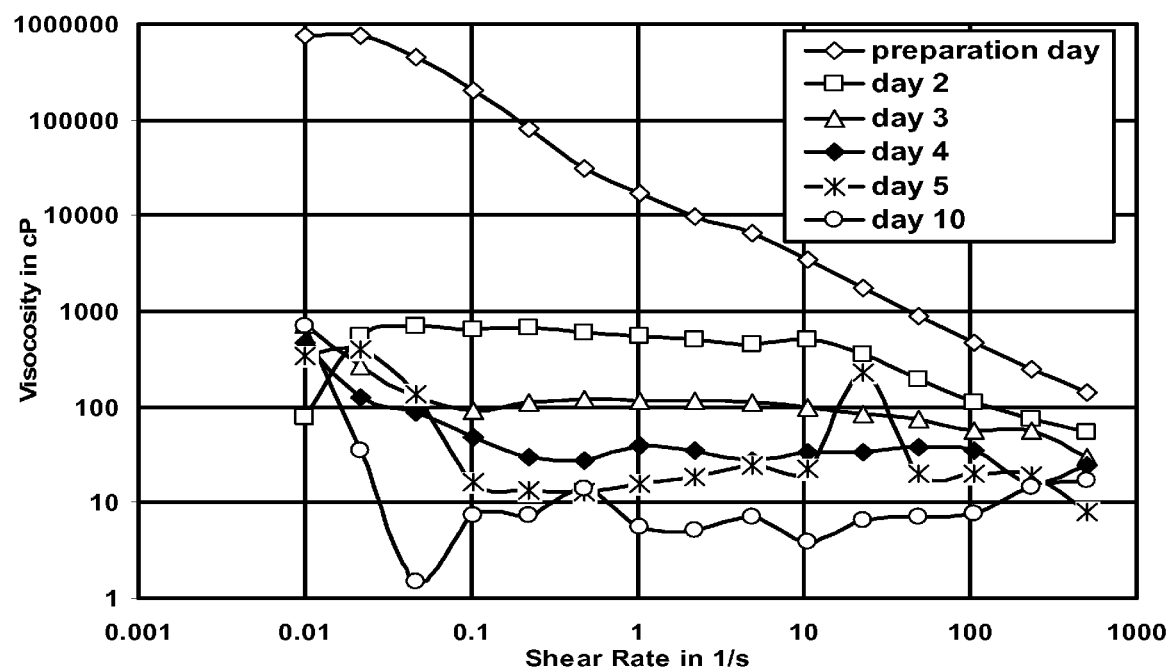
FIG. 6 shows the viscosity vs. shear rate and time of a fluid viscosified with a viscoelastic surfactant system and weighted with $CaCl_2$ containing a wax internal filter cake/matrix breaker of the Invention.

FIG. 5 shows the same experiment as that of FIG. 4, except that the added salt was $CaBr_2$. The fluid was less stable than that with NaBr. FIG. 6 shows the same experiment as those of FIGS. 4 and 5, except that the salt was $CaCl_2$. The fluid has a higher viscosity and is more stable than the fluids than $CaBr_2$ or NaBr. In heavy brines, the break can be controlled further by the choice of the weighting salt.

Not shown are data from an experiment done with another wax dispersion, "polyethylene 629A30" also obtained from ChemCor, Chester, N.Y., U.S.A., and also called a wax "emulsion" by the manufacturer. The polyethylene was low-density, had a melting point of 104° C., had been made anionic by copolymerization with acrylic acid, to aid in the emulsification, and was in the sodium form. In experiments similar to those described above, this material did not break the viscoelastic surfactant, even above its melting point.

Example 2

Polyesters

Figure 7:
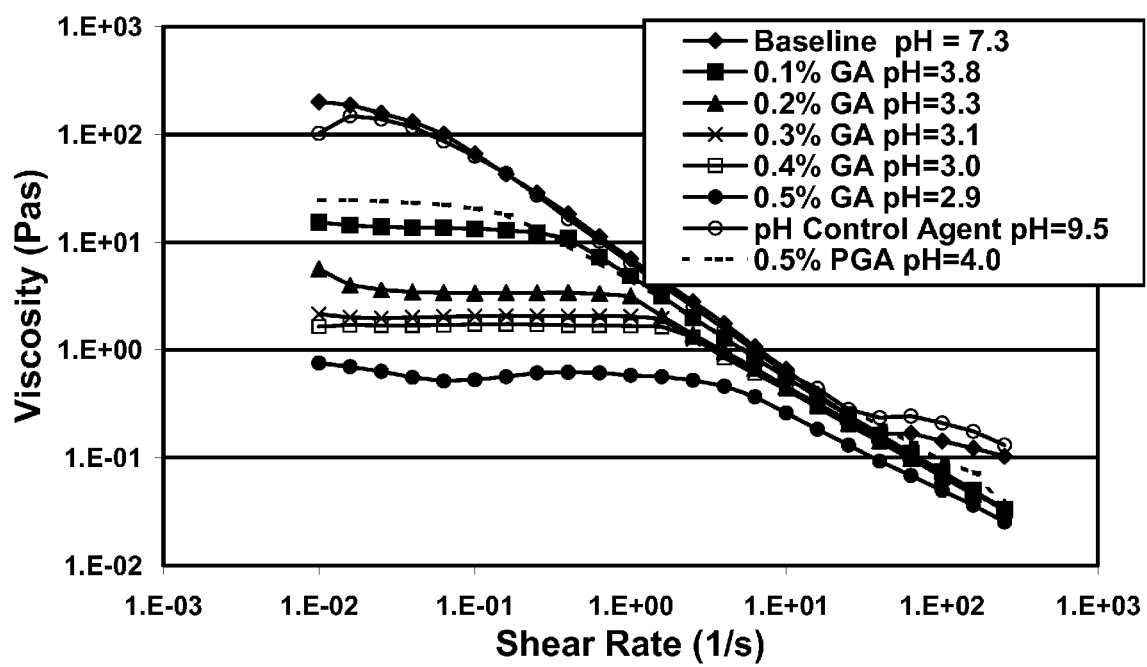
FIG. 7 shows the effect of an internal filter cake former/matrix breaker of the Invention and its decomposition product as a function of pH on the viscosity of a VES based fluid system as a function of shear rate.

That carboxylic acids released by the degradation of polyesters are VES breakers is demonstrated in FIG. 7, which shows measurements of the viscosity of one example of a VES fluid system with different amounts of glycolic acid (GA) dissolved in the fluid. Measurements were conducted at 66° C. (150° F.). The buffer used in the experiments shown in FIG. 7 was sodium sesquicarbonate, which was used at a concentration of 30 pounds per thousand gallons (3.6 g/L) in all experiments. The VES fluid system was made with 6% of the same viscoelastic surfactant concentrate as was used in Example 1. This experiment showed the results that would be seen as polyglycolic acid (PGA) degrades, and demonstrates the breaking effect on the fluid viscosity as the PGA hydrolyzes to form glycolic acid. In addition, the data in the figure also demonstrate that the viscosity of this VES is not significantly reduced by the addition of a pH buffer to maintain the fluid pH at approximately 9.5.

It can be seen that the viscosity of the surfactant system with no buffer or PGA (top line, diamonds) was reduced by the addition of 0.5% PGA (42 pounds per thousand gallons, or 0.5 g/L), and the pH had already gone down to 4 when it was measured. The PGA used was DuPont TLF 6267™, which may contain up to about 5% glycolic acid as received, and about 90% of which has a particle size of less than about 20 microns. This material is a crystalline PGA with a molecular weight of about 600. To simulate hydrolysis and dissolution of PGA, increasing amounts of GA were added to portions of the baseline fluid system; this resulted in successively greater decreases in the viscosity. The viscosity of the baseline material was not affected by the addition of sodium sesquicarbonate to buffer the system at a pH of approximately 9.5.

Figure 8:
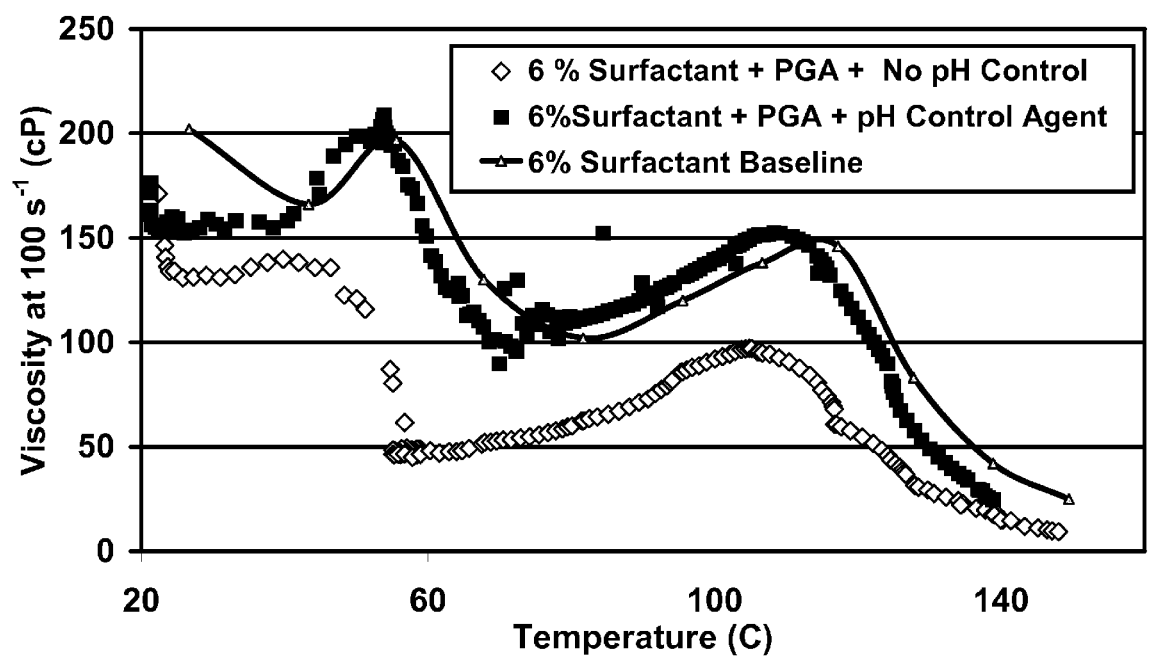
FIG. 8 shows the effect of an internal filter cake former/matrix breaker of the Invention, with and without a pH control agent, on the viscosity of a VES based fluid system as a function of temperature.

FIG. 8 shows the viscosity of the same 6% surfactant fluid system as the baseline system of the experiments shown in FIG. 7, determined with a Fann 50 Viscometer over a range of temperatures, with PGA added, with and without the pH 9.5 buffer. Without the buffer in place, the viscosity of the fluid was substantially reduced; therefore this PGA alone would have been unsatisfactory as an internal filter cake former and/or as a matrix breaker, except for the shortest of oilfield treatments. With the buffer present, the viscosity of the fluid system containing the PGA as an FLA and delayed breaker was essentially identical to the viscosity of the baseline system. The total duration of each of these experiments was about 3 hours. At the end of the run with the buffer it can be seen that the viscosity dropped below the baseline, suggesting that the hydrolysis of the PGA at the higher temperature was starting to break the fluid when the temperature was above about 121° C. (250° F.). (The buffer was being overwhelmed at this point.) The time that this system was at about 121° C. (250° F.) was about 160 minutes. Therefore, this fluid system, containing PGA as an FLA and delayed breaker, is suitable for use in hydraulic fracturing and gravel packing.

Example 3

Dry Emulsions

The dry emulsion used was obtained from Rhodia, Inc. Cranbury, N.J., U.S.A. and was made by preparing a dispersion of an oil phase in water using a hydrophilic polymer as the shell-polymer, and then drying the resulting emulsion to form a dry solid. Such dry emulsions are usually stabilized with a surfactant and/or with a hydrophilic polymeric stabilizer. Such dry emulsion materials are a very convenient method of encapsulating organic compounds that are VES breakers, by dissolving them in the oil phase before formation of the dry emulsion. The choice of oil solvent type and amount, surfactant type and concentration, hydrophilic polymer type and amount, and VES breaker type and concentration in the oil, all have an impact on the particle size of the "dried emulsion", as well as on the extent of the break, and the delay, when the IFCMB is used to break a VES fluid system. All of these selections depend upon the required conditions for the specific oilfield application. It should be noted that the emulsion, before drying, may also be used as an IFCMB.

In experiments not shown, the viscosity of a fluid containing 6 weight % of the same viscoelastic surfactant concentrate used in the previous examples in a 1.39 kg/L (11.6 ppg (pounds per gallon)) NaBr brine was followed in a Fann 50 Rheometer at 65.6° C. (150° F.) for up to 14 hours. With no added breaker, the viscosity was constant at about 40 cP at 100 $sec^{-1}$. When 1% by weight of the dry emulsion made with the oil had been added, the viscosity was still constant. When 2% by weight of the same dry emulsion had been added, the viscosity began to decrease after about 7 hours and was similar to that of water after about 12 hours.

Figure 9:
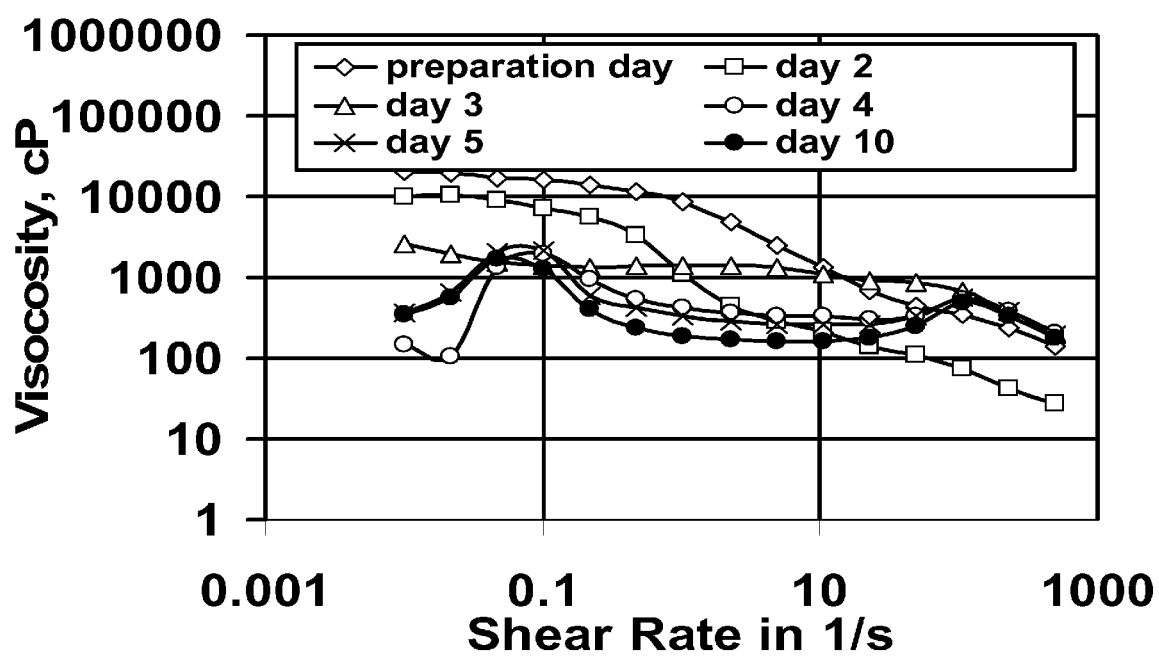
FIG. 9 shows the viscosity vs. shear rate from the day of preparation to the tenth day of storage of a betaine viscoelastic surfactant fluid system containing a dry emulsion internal filter cake former/matrix breaker of the Invention.

FIG. 9 shows the viscosity vs. shear rate from the day of preparation to the tenth day of storage at 65.6° C. (150° F.) of a betaine viscoelastic surfactant fluid system containing a dry emulsion internal filter cake former/matrix breaker of the Invention. The fluid contained 6 weight % of the same viscoelastic surfactant concentrate used in the previous examples in a 1.38 kg/L (11.5 ppg (pounds per gallon)) NaBr brine with 1 weight % of the dry emulsion made with the paraffin oil. The viscosity was measured at 65.6° C. (150° F.) with a Bohlin rheometer. The low shear viscosity declined steadily over the ten days to about 1/1000 of its original value but it was still significant at the end of the experiment. The high shear viscosity was constant for at least the first 5 days, but had decreased substantially after 10 days.

Figure 10:
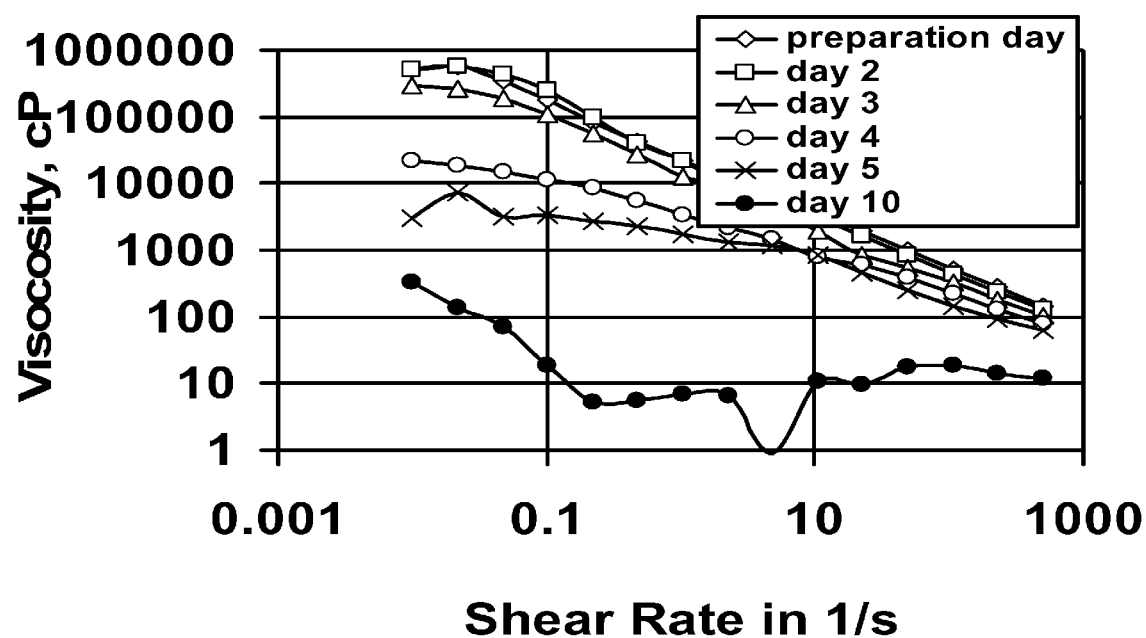
FIG. 10 shows the viscosity vs. shear rate from the day of preparation to the tenth day of storage of a betaine viscoelastic surfactant fluid system containing a dry emulsion internal filter cake former/matrix breaker of the Invention.

FIG. 10 shows the viscosity vs. shear rate from the day of preparation to the tenth day of storage at 65.6° C. (150° F.) of a betaine viscoelastic surfactant fluid system containing a dry emulsion internal filter cake former/matrix breaker of the Invention. The fluid contained 6 weight % of the same viscoelastic surfactant concentrate used in the previous examples in a 1.38 kg/L (11.5 ppg (pounds per gallon)) $CaCl_2$ brine with 1 weight % of the dry emulsion made with the paraffin oil. The viscosity was measured at 65.6° C. (150° F.) with a Bohlin rheometer. The behavior was similar to that observed in FIG. 9, except that the high shear viscosity decreased somewhat during the first 5 days too.

Figure 11:
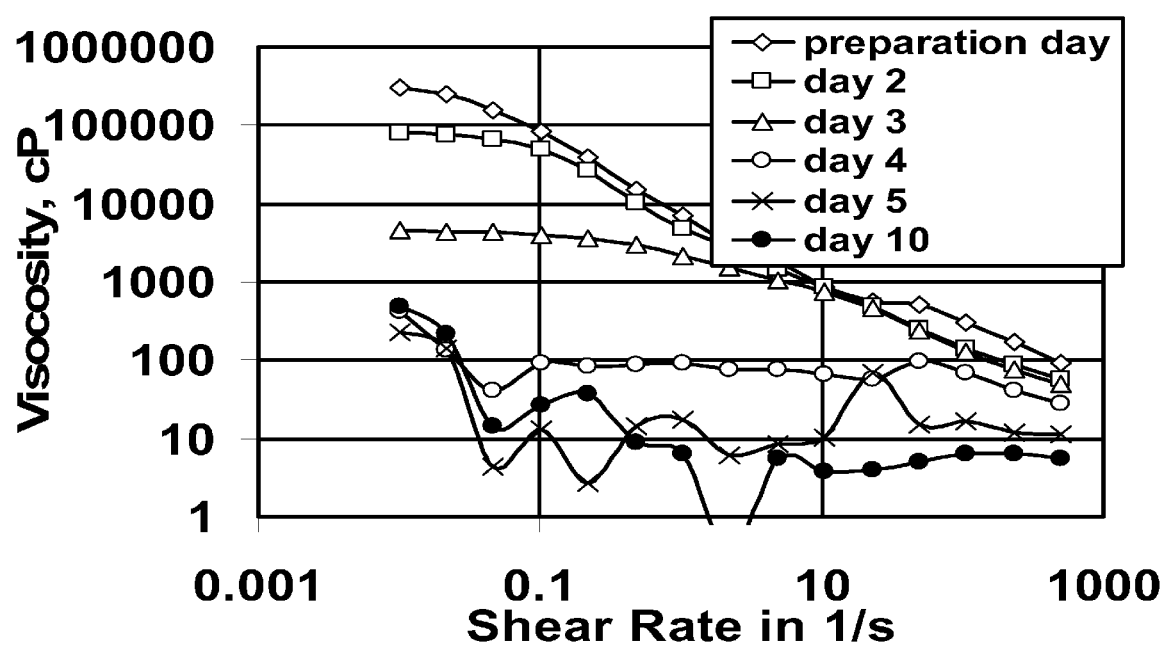
FIG. 11 shows the viscosity vs. shear rate from the day of preparation to the tenth day of storage of a betaine viscoelastic surfactant fluid system containing a dry emulsion internal filter cake former/matrix breaker of the Invention.

FIG. 11 shows the viscosity vs. shear rate from the day of preparation to the tenth day of storage at 65.6° C. (150° F.) of a betaine viscoelastic surfactant fluid system containing a dry emulsion internal filter cake former/matrix breaker of the Invention. The fluid contained 6 weight % of the same viscoelastic surfactant concentrate used in the previous examples in a 1.38 kg/L (11.5 ppg (pounds per gallon)) CaBr brine with 1 weight % of the dry emulsion containing a paraffin oil. The viscosity was measured at 65.6° C. (150° F.) with a Bohlin rheometer. The low shear behavior was similar to that observed in the previous two experiments, but the decrease in viscosity at intermediate and high shear rates occurred more uniformly over the entire time period.

Figure 12:
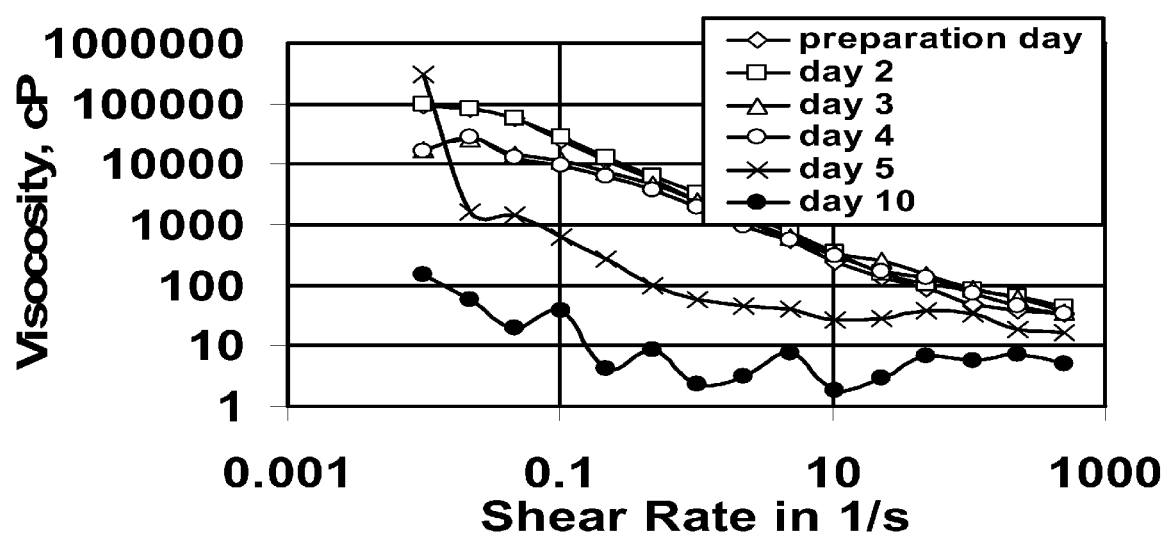
FIG. 12 shows the viscosity vs. shear rate from the day of preparation to the tenth day of storage of a betaine viscoelastic surfactant fluid system containing a dry emulsion internal filter cake former/matrix breaker of the Invention.

FIG. 12 shows the viscosity vs. shear rate from the day of preparation to the tenth day of storage at 65.6° C. (150° F.) of a betaine viscoelastic surfactant fluid system containing a dry emulsion internal filter cake former/matrix breaker of the Invention. The fluid contained 4 weight % of the same viscoelastic surfactant concentrate used in the previous examples in a 1.38 kg/L (11.5 ppg (pounds per gallon)) NaBr brine with 1 weight % of the dry emulsion containing a paraffin oil. The viscosity was measured at 65.6° C. (150° F.) with a Bohlin rheometer. There was little loss of low shear viscosity until after the fifth day and little loss of high shear viscosity until the fifth day.

What is claimed is:

1. A method of treating a subterranean formation penetrated by a wellbore comprising a formation surface comprising
    a) injecting into the formation through the formation surface a fluid comprising a viscosifier and a solid additive comprising particles sufficiently small to pass into the formation pores, said solid additive comprising a material degradable in the formation, and
    b) allowing said additive to degrade into a material soluble in a fluid in the pores after the injection;
    wherein the particles comprise a material selected from the group consisting of waxes, polycarbonates, polyacetals, polymelamines, polyvinyl chlorides, polyvinyl acetates, polyvinyl esters, polyacrylates, polymethacrylates, polycarboxylates, and mixtures thereof; and
    wherein the fluid further comprises a pH control agent present in an amount sufficient to neutralize any acid or base present in the solid material before the injection and any acid or base generated by the solid material during the injection.

2. The method of claim 1 wherein said material is degradable by a mechanism selected from thermal degradation, melting, hydrolysis and any combination of thermal degradation, melting, and hydrolysis.

3. The method of claim 1 further comprising allowing fluid to flow between the formation and the wellbore or between the wellbore and the formation.

4. The method of claim 1 wherein the particles form an internal filter cake.

5. The method of claim 2 wherein the particles further form an external filter cake.

6. The method of claim 1 wherein the particles do not form an external filter cake.

7. The method of claim 1 wherein the soluble material is a breaker for the viscosifier.

8. The method of claim 1 wherein the step of injection is carried out above the formation fracture pressure to form one or more fractures having faces.

9. The method of claim 1 wherein the fluid further comprises proppant or gravel.

10. The method of claim 1 wherein the fluid further comprises a formation dissolving compound.

11. The method of claim 1 wherein the viscosifier comprises a viscoelastic surfactant.

12. The method of claim 11 wherein the viscoelastic surfactant is selected from the group consisting of quaternary amines, betaines, carboxylic acids, and amidoamine oxides.

13. The method of claim 1 wherein the viscosifier comprises a polysaccharide.

14. The method of claim 13 wherein the viscosifier comprises a polysaccharide and the particles comprise a material selected from the group consisting of polyesters, polycarbonates, polyacetals, polymelamines, polyvinyl chlorides, polyvinyl acetates, polyvinyl esters, polyacrylates, polymethacrylates, polycarboxylates and mixtures thereof.

15. The method of claim 1 wherein the particles comprise polyesters.

16. The method of claim 1 wherein the viscosifier comprises a viscoelastic surfactant and the particles comprise a material selected from the group consisting of waxes, polyesters, polycarbonates, polyacetals, polymelamines, polyvinyl chlorides, polyvinyl acetates, polyvinyl esters, polyacrylates, polymethacrylates, polycarboxylates, and mixtures thereof.

17. The method of claim 1 wherein the fluid further comprises a fluid loss additive comprising particles too large to pass into the formation pores.

18. The method of claim 1 wherein said solid additive particles do not form a substantially water impermeable film on formation or fracture faces.

19. The method of claim 1 wherein the particles are provided as a suspension.

20. The method of claim 1 wherein the particles are provided as a dispersion.

21. The method of claim 1 wherein the particles are provided as a latex.

22. The method of claim 1 wherein the particles are provided in the internal phase of an oil-in-water emulsion.

23. The method of claim 1 wherein the particles are provided inside structures selected from the group consisting of micelles, liposomes, vesicles, eucariote and procariote cells, and bacteria.

24. The method of claim 23 wherein the particles are provided inside micelles.

25. The method of claim 23 wherein the particles comprise a member selected from the group consisting of long chain alcohols, aliphatic or aromatic solvents, fatty acids, fatty acid esters, mono, di or triglycerides of fatty acids, long chain alcohol phosphate esters, diacid esters and mixtures thereof.

\* \* \* \* \*